United States Patent
Fasoli et al.

(10) Patent No.: US 11,328,364 B2
(45) Date of Patent: May 10, 2022

(54) SINGLE ENTRY COMBINED FUNCTIONALITY

(71) Applicant: Synchrony Bank, Stamford, CT (US)

(72) Inventors: David Fasoli, Aliso Viego, CA (US); Clarinda Gurr, Irvine, CA (US); Erin Gadhavi, Laguna Niguel, CA (US); Annabel Larsen, Stamford, CT (US); Kendra Larsen, Huntington Beach, CA (US); Craig Urbansky, Costa Mesa, CA (US); Sally Yijing Yang, San Juan Capistrano, CA (US); Bete Johnson, Trabuco Canyon, CA (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

(21) Appl. No.: 17/082,828

(22) Filed: Oct. 28, 2020

(65) Prior Publication Data

US 2021/0125287 A1  Apr. 29, 2021

Related U.S. Application Data

(60) Provisional application No. 62/926,658, filed on Oct. 28, 2019.

(51) Int. Cl.
*G06Q 20/10* (2012.01)
*G06Q 20/22* (2012.01)
*G06Q 20/40* (2012.01)
*G06Q 40/08* (2012.01)
*G06N 20/00* (2019.01)

(52) U.S. Cl.
CPC ............ *G06Q 40/08* (2013.01); *G06N 20/00* (2019.01); *G06Q 20/102* (2013.01); *G06Q 20/227* (2013.01)

(58) Field of Classification Search
CPC .... G06Q 10/10; G06Q 20/102; G06Q 20/227; G06Q 40/08; G06Q 20/10; G06N 20/00
See application file for complete search history.

(56) References Cited

U.S. PATENT DOCUMENTS

| | | | |
|---|---|---|---|
| 7,197,468 B1* | 3/2007 | Patricelli | G06Q 10/10 705/4 |
| 2012/0239417 A1* | 9/2012 | Pourfallah | G06Q 20/384 705/2 |
| 2012/0239560 A1* | 9/2012 | Pourfallah | G06Q 40/08 705/40 |
| 2017/0178135 A1* | 6/2017 | Bull | G06Q 10/1057 |

* cited by examiner

*Primary Examiner* — Joseph W. King
(74) *Attorney, Agent, or Firm* — Polsinelli PC

(57) ABSTRACT

Computer-implemented methods are provided for receiving information corresponding to a transaction, wherein the information is received via a single processing of an instrument. A balance for the transaction is automatically determined based on a coverage plan associated with the information from the instrument and services associated with the transaction. Upon detecting selection of an account for the balance, an amount from the account is allocated for the balance and is provided to complete the transaction.

21 Claims, 14 Drawing Sheets

Payment

1. Account >  2. Insurance >  3. Payment >  4. Receipt

Account Holder  John Smith (-1234) has CareCredit insurance.

Patient Covered  Snowball

Plan Details  Plan A (Policy #224-13264)
Carryover deductible: $xx
xxOtherPlanDetailsxx....: $xx

*Data pulled in via integration or manually added*

| Date | Service/Product | Cost | Plan Coverage | Client Responsibility |
|---|---|---|---|---|
| 10/1/19 | Wellness Examination | $50 | $50 | $0 |
| 10/1/19 | Lab Work – Complete Blood Count | $150 | $150 | $0 |
| 10/1/19 | CAT scan | $900 | *Pending* | $900 |
| 10/1/19 | Diagnostics – X-Ray 1st Plate | $900 | *Pending* | $900 |
| | Total | $2,000.00 | $200.00 | $1,800.00 |

Next    Skip

FIG. 7C

SINGLE ENTRY COMBINED FUNCTIONALITY

CROSS-REFERENCE TO RELATED APPLICATIONS

The present patent application claims the priority benefit of U.S. provisional patent application No. 62/926,658 filed Oct. 28, 2019, the disclosures of which are incorporated by reference herein.

BACKGROUND

Field of the Technology

The present invention is related to application functionality. More specifically, the present invention is related to single entry combined functionality.

Description of the Related Art

Presently, data entered into a system is often associated with a single functionality. For example, using an instrument can result in performance of a singular function corresponding to a particular transaction. In some situations, for example, a medical event, may require both an identification of insurance data (e.g., to cover some or all of the medical event), and an identification of other data to enable a transaction associated with the event (e.g., for a deductible or for the event entirely). Indeed, sometimes an account can include available funds that can be applicable to the balance of a medical event, but some present systems require a transaction to be covered in full followed by a request for reimbursement, which can be cumbersome.

For example, when a user completes a medical event (e.g., an event related to human or pet health), the user may provide its medical insurance data and one or more transaction instruments including cash, check, debit, HSA/FSA or credit/financing. When applying this data to healthcare-related balances, this process can involve first finalizing the transaction in full on the day of service, then at a later date, submitting a claim requesting full or partial transaction reversal for the medical event. Full or partial transaction reversal may be provided in the form of an instrument to the user, which is subsequently deposited by the user back into their account, which may then be used to replenish or pay off any borrowed amounts. This process is cumbersome and there are several opportunities to improve upon this process.

There is, therefore, a need in the art for improved systems and methods that are capable of cross-referencing data and concurrently performing more than one functionality based upon a single data entry (e.g., typed entry, scanned entry, swiped entry, etc.).

SUMMARY

The first improvement is at the point-of-sale. Presently, a user instrument is associated with singular functionality—user has one instrument for utilizing its coverage plan and separate instrument(s) for balance coverage. Some embodiments seek to combine these instruments by providing a single instrument that can be used to (1) identify different forms of data associated with the user, (2) simultaneously enable multiple functions (e.g. medical coverage and balance coverage) and (3) allow users to select among payment sources available to the user. The use of the single instrument can be, but is not limited to, a swipe of an instrument via a terminal. It can also involve manual data entry, chip insert, instrument scan/tap, mobile funding technology, or any other means to identify the data being used.

In some embodiments, this instrument will eliminate system silos between different functions, enabling data-sharing across platforms. This infrastructure change will allow for a seamless user experience from (1) account(s) identification to (2) adjudication to (3) payment to (4) relevant automatic transaction reversals—all in a single transaction from the user's perspective.

In some embodiments, by elimination of such silos, the infrastructure presented above will facilitate real-time, cross-database machine learning and artificial intelligence to drive more efficient, accurate, real-time adjudication, reduce the number of manual reviews required, offer users access to find treatment options with higher coverage, and provide customized information to help the user maximize savings and allocate funds for their healthcare expenses.

BRIEF DESCRIPTION OF THE DRAWINGS

FIGS. 7A-7F show illustrative examples of an interface of a system configured to process an instrument for coverage adjudication and payment processing in accordance with at least one embodiment.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide for an improved system wherein multiple functionalities can be performed based upon data received from processing of an instrument (e.g., by swiping an instrument, by manually typing in the data associated with the instrument, by scanning the data from a receipt or other document including barcode data, etc.).

Figure 1:
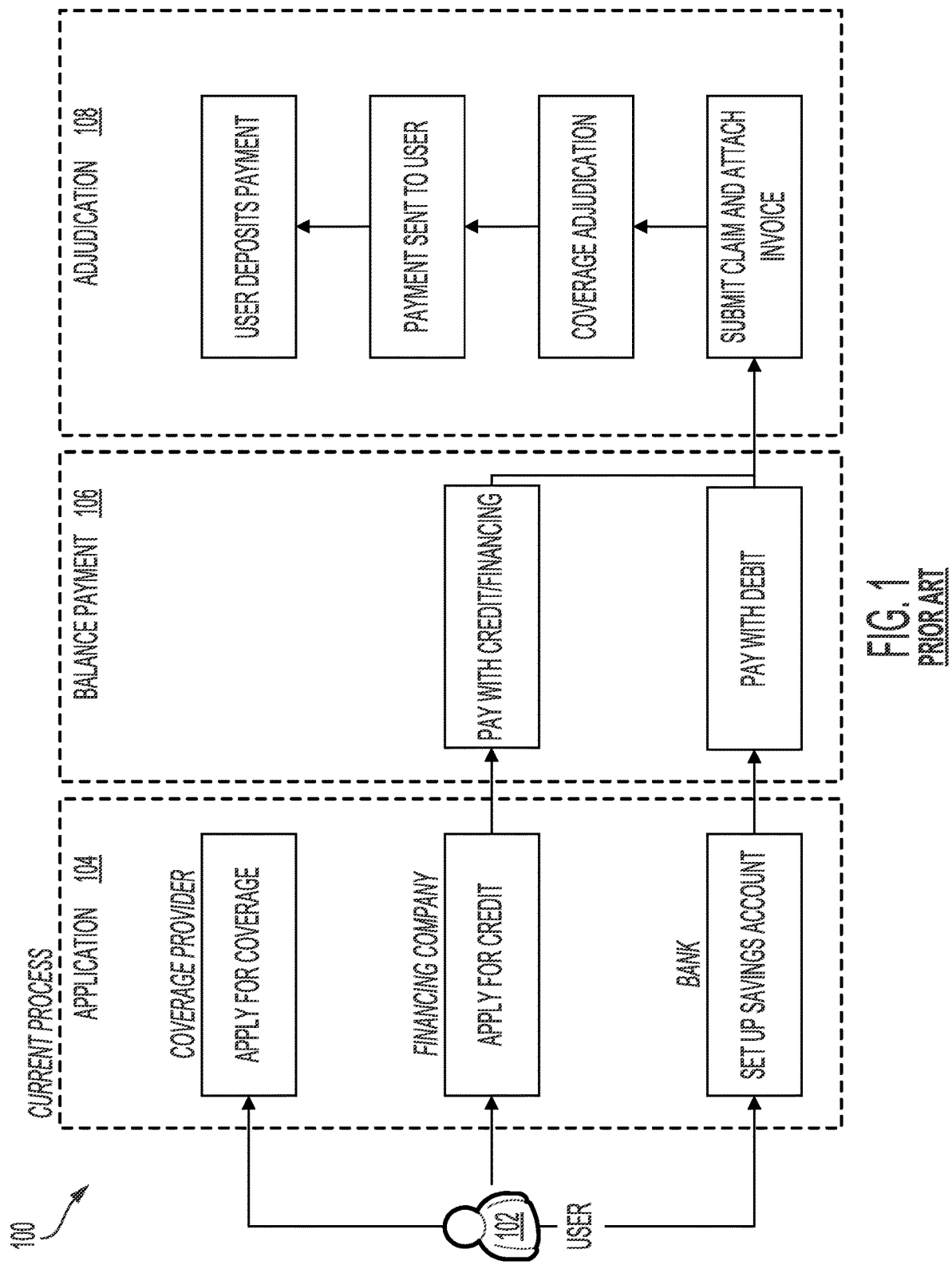
FIG. 1 shows an illustrative example of an environment according to the current state of the art for coverage adjudication and payment processing.

FIG. 1 shows an illustrative example of an environment 100 according to the current state of the art for coverage adjudication and payment processing. In the environment 100, an application process 104 for a particular 102 involves disparate steps. For instance, a user 102 may be required to interact with a coverage provider (e.g., insurance provider, healthcare provider, etc.) to apply for medical coverage. Medical coverage may include coverage for human treatments and procedures, veterinary treatments and procedures, cosmetic procedures, dental treatments and procedures, therapeutic procedures, and the like. Further, the user 102 may be required to maintain separate lines of credit or otherwise set up a savings or other financial account that can be used for payment of balances associated with medical procedures, treatments, or visits. Applying for a new line of credit or setting up a savings or other financial account are typically performed via a financing company, a bank, a credit union, or other financial institution that is wholly separate from a coverage provider. Thus, the user 102 may have to interact with different entities in order to obtain its medical coverage and to obtain or otherwise set up financial accounts (e.g., bank accounts, lines of credit, etc.) in order to provide payment for user medical responsibilities.

The balance payment process 106 and coverage adjudication process 108 under the current state of the art is also onerous. For instance, as part of the balance payment process 106 after a medical procedure or other act that requires use of the user's medical coverage, the user 102 may be required to provide full payment for the medical procedure or other act using a line of credit or its debit/bank account. For certain users, this may be difficult, particularly procedures or acts that can be financially burdensome to users upfront. To further complicate matters for the user 102, once full payment has been provided for a medical procedure or other act, the user 102 may be required to engage in an adjudication process 108 via its coverage provider. For instance, the adjudication process 108 may require the user 102 to submit a coverage claim to the coverage provider and provide an invoice for the medical procedure or other act. The coverage provider may review the claim and the invoice provided by the user 102 and adjudicate the claim subject to the medical coverage of the user 102.

If the coverage provider determines that the user 102, under its medical coverage, is entitled to reimbursement of some or all of payment submitted for the medical procedure or other act, the coverage provider may send the user 102 a reimbursement payment. This reimbursement payment may be in the form of a physical check, which the user 102 may be required to deposit into its account. However, the adjudication process 108 can also be onerous and time consuming, whereby the user 102 may be required to wait several days or weeks in order to determine whether it is entitled to a reimbursement under its medical coverage. Further, the user 102 may be required to deposit the reimbursement at a financial institution. As a result, the adjudication process 108 can leave the user 102 financially exposed until reimbursement is obtained. Further, the user 102 may be unaware of the reimbursement owed to it until the reimbursement is actually sent to the user 102 by the coverage provider.

Figure 2:
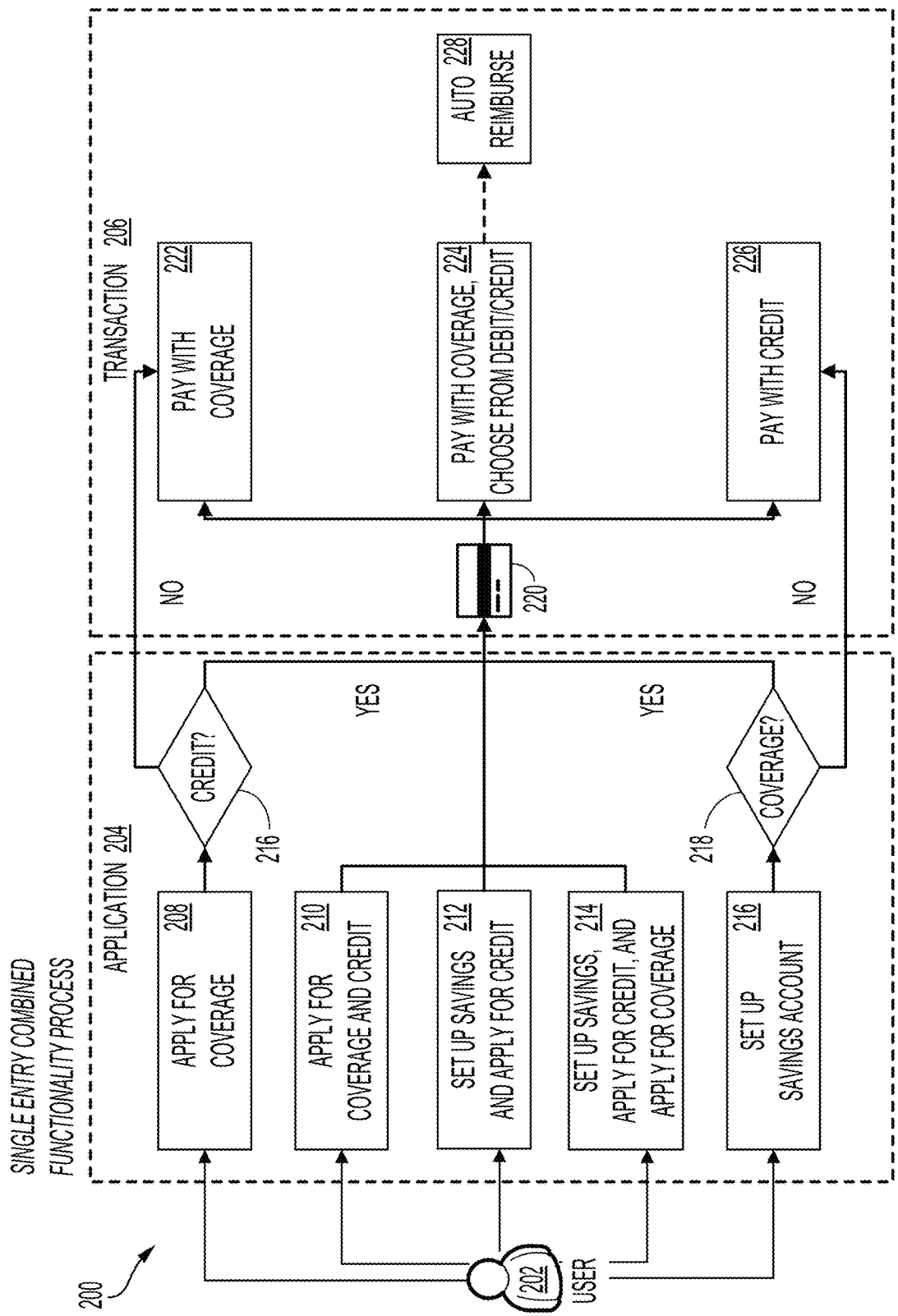
FIG. 2 shows an illustrative example of an environment in which an instrument is processed to perform coverage adjudication and to obtain payment based on the coverage adjudication in accordance with various embodiments.

FIG. 2 shows an illustrative example of an environment 200 in which an instrument is processed to perform coverage adjudication and to obtain payment based on the coverage adjudication in accordance with various embodiments. In the environment 200, a user 202 can engage in an application process 204 through an enrollment system that is in communication with a plurality of services (e.g., coverage services, credit services, banking or other financial services, etc.) to enable the user 202 to apply for medical coverage and/or a line of credit via the enrollment system. The enrollment system may be implemented by a credit provider or other financial institution that provides lines of credit to users. Alternatively, the enrollment system may be implemented by a coverage provider, which may provide different coverage options to users based on characteristics of the users or of entities associated with the users that are to be covered (e.g., pets, relatives, etc.). In some embodiments, the enrollment system can be implemented by a third-party that is in communication with one or more credit providers and one or more coverage providers to provide users with possible combinations of credit and coverage options. It should be noted that while medical coverage and medical coverage providers are described extensively throughout the present disclosure for the purpose of illustration, other forms of coverage and coverage providers are considered to be within the scope of the present disclosure. For example, the embodiments described herein may be applicable to automobile coverage, home coverage, travel coverage, renters' coverage, life coverage, and the like. Further, the embodiments described herein may be applicable to the coverage providers of the aforementioned different types of coverage.

The enrollment system may be implemented at a point-of-sale, such as a medical practitioner office, hospital, medical center, pharmacy, or other location where medical coverage may be utilized by users for medical treatments, procedures, or other acts. Additionally, or alternatively, the enrollment system may be implemented via an online system provided by a coverage provider, credit provider or other financial institution, or third-party that is in communication with one or more credit and coverage providers. For instance, a user 202 may access a website implemented by a coverage provider or credit provider to initiate enrollment in a coverage plan and/or a line of credit.

At step 208 of the application process 204, a user 202 may apply for medical coverage through one or more coverage providers associated with the enrollment system. For instance, through the enrollment system, the user 202 may provide demographic information about the user 202 or other entity that is to receive medical coverage, medical history of the user 202 or other entity, and the like. Based on this provided information, the enrollment system may identify one or more coverage plans that the user 202 or other entity is eligible for. For example, if the enrollment system is implemented by a coverage provider, the enrollment system may utilize the information provided by the user 202, along with underwriting data available through the coverage provider, to identify one or more coverage plans and the costs associated with each of these one or more coverage plans. The underwriting data may include demographic information for other similarly situated individuals. For instance, the underwriting data may include known salary information, medical expenses, and the like for individuals in a particular location. This information may also be sorted according to other demographic features, such as age, race, gender, and the like. Thus, based on one or more demographic characteristics of the user 202 or other entity that is to be subject to a coverage plan and underwriting data corresponding to these characteristics, the enrollment system may identify the one or more coverage plans that the user 202 or other entity is eligible for, as well as the cost of enrollment for each of these one or more coverage plans.

In an embodiment, the enrollment system utilizes machine learning and/or artificial intelligence to identify the one or more coverage plans that may be offered to the user 202. For instance, as part of the application process 204, the enrollment system may process the provided information as input to a machine learning model or artificial intelligence to predict the user's future medical coverage needs and provide recommendations for different coverage plans for its needs. The machine learning model or artificial intelligence utilized by the enrollment system may be trained using unsupervised learning techniques. For instance, a dataset of input user information for various users (including, but not limited to, medical expenses per user over a particular period of time, demographic information per user, etc.) may be analyzed using a clustering algorithm to identify estimated medical expenditures or coverage usage for certain types of users. Example clustering algorithms that may be trained using this dataset maintained by a coverage provider to forecast a user's future medical expenses and recommend coverage options may include k-means clustering algorithms, fuzzy c-means (FCM) algorithms, expectation-maximization (EM) algorithms, hierarchical clustering algorithms, density-based spatial clustering of applications with noise (DB-SCAN) algorithms, and the like. Based on the output of the machine learning model or artificial intelligence, the enrollment system may determine which coverage plans may be offered to the user 202.

If the user 202, at step 208, applies for a coverage plan and is approved for a coverage plan selected via the enrollment system, the enrollment system determines, at step 216, whether a line of credit is to be associated with the coverage plan. For instance, once the user 202 is approved for a coverage plan, the enrollment system may prompt the user 202 to determine whether the user 202 would like to associate a line of credit or other financing option (e.g., a bank account, a savings account, a checking account, etc.) with the coverage plan. For instance, via the enrollment system, the user 202 may provide account information associated with a line of credit or other financial account (e.g., credit card number, credit card expiration date, credit or other financial provider address, routing number, account number, etc.). The enrollment system may utilize the account information provided by the user 202 to access the corresponding credit provider or other financial provider to verify that the user 202 has an account with the credit provider or other financial provider. Once the verification process is completed, the enrollment system may associate the coverage plan with the credit or other financial account specified by the user 202.

In an embodiment, if the user 202 associates a line of credit or other financial account with the selected coverage plan, the enrollment system issues a payment instrument 220 that incorporates data associated with the line of credit or other financial account and the selected coverage plan. The user 202 may receive the payment instrument 220 associated with the selected coverage plan and the user's line of credit or other financial account. This may allow the user 202 to utilize the payment instrument 220 when the user 202 sees a doctor or otherwise engages in an action that requires presentation of a medical coverage card (e.g., visits a hospital for a medical procedure, obtains a prescription from a pharmacy, etc.) or use of one or more medical coverage plan benefits. As described in further detail herein, the payment instrument 220 may be used to determine the user's coverage and to reduce the user's responsibility based on the user's coverage. Further, the payment instrument 220 may be used to provide payment for any outstanding balances associated with the medical procedure, treatment, or other action that invokes use of the user's coverage plan benefits. The payment instrument 220 may be implemented as a physical card, a digital card (e.g., digital wallet, etc.), and the like.

In an embodiment, a user 202, at step 210, can apply for both a medical coverage plan and a line of credit in a single interaction via the enrollment system. For instance, via the enrollment system, a user 202 may be offered one or more medical coverage plans and the user 202 may select a particular medical coverage plan, as described above. Once the user 202 has selected a medical coverage plan, the enrollment system may interact with one or more credit providers to determine whether the user 202 is qualified for a line of credit that can be associated with the medical coverage plan. For instance, using information associated with the user 202 (e.g., birthdate, last four digits of a Social Security number, etc.), the enrollment system may perform a soft inquiry of the user's credit report to determine whether the user 202 can be pre-approved for a line of credit that can be used for medical expenses. The amount of the line of credit may be determined based on the medical coverage plan selected by the user 202, the results of the soft inquiry of the user's credit report, the user's salary information, and the like. For instance, if the maximum deductible of the user's medical coverage plan is greater than the maximum line of credit amount that can be offered to the user 202, the enrollment system may provide the user 202 with an option to allow the user 202 to apply for a line of credit corresponding to the maximum line of credit amount. Alternatively, if the maximum deductible of the user's medical coverage plan is less than the maximum line of credit amount that can be offered to the user 202, the enrollment system may allow the user 202 to apply for a line of credit corresponding to the maximum deductible amount. In some instances, the user 202 may forego this determination and define a maximum line of credit amount that the user 202 wishes to apply for.

If the user 202 opts to apply for a line of credit, the application for the line of credit can be provided to a credit provider, which may evaluate the application to determine whether the user 202 is approved for a line of credit. If the user 202 is approved for a line of credit, the credit provider may determine the amount of this line of credit. For instance, if the line of credit is to be equal to the maximum deductible for the user's medical coverage plan, the credit provider may determine whether the user 202 qualifies for a line of credit in this amount. As another example, if the user is approved for a line of credit that does not exceed the maximum deductible of the selected medical coverage plan, the credit provider may indicate, to the user 202 via the enrollment system, that it is approved for a line of credit in the determined amount. If the user 202 is approved for a line of credit, the user 202 is issued a payment instrument 220 associated with the selected medical coverage plan and the line of credit approved by the credit provider for the user 202.

In an embodiment, the enrollment system utilizes a machine learning model or artificial intelligence trained using unsupervised learning techniques to provide the user 202 with a forecast of possible medical expenditures over a period of time. For instance, in the application for the line of credit, a user 202 may be prompted to indicate whether it is anticipating any events that may have an impact on the user's medical expenditures over a particular period of time (e.g., birth of a child, an operation, etc.). The enrollment system may use this information from the user's application, as well as any available information corresponding to the user's historical medical expenses and credit worthiness over prior periods, as input to a machine learning model or artificial intelligence to predict the user's medical expenses for the upcoming period of time and provide recommendations for establishing a line of credit. The information submitted for determining these recommendations may be limited to the enrollment system and may be omitted from the coverage provider to prevent influence on the coverage plan options offered to the user 202. In some instances, the machine learning model or artificial intelligence may be implemented by the credit provider, thereby limiting exposure of information submitted by the user 202 for forecasting possible medical expenditures from the coverage provider.

In an embodiment, the enrollment system can utilize the user's responses in the application for a line of credit as input to the machine learning model or artificial intelligence to provide the user 202 with recommendations for establishing a line of credit, establishing and funding a health spending account (HSA), and the like. The machine learning model or artificial intelligence may use the provided information to identify a corresponding cluster of other users that may be similarly situated (e.g., have enrolled in a similar medical coverage plan, have experienced medical events similar to those anticipated by the user 202, are within a similar geographic area with similar cost of living and expenses, etc.). From this cluster, the machine learning model or artificial intelligence may forecast the user's likely future medical expenses and, based on these future medical expenses, provide the user 202 with recommendations for managing these future medical expenses. This may include recommending establishment of a line of credit with a particular credit provider, recommending an amount to contribute to an HSA, recommending how much to save in addition to contributions to an HSA and maintaining a line of credit, and the like.

In an embodiment, at step 212, a user 202 can set up or otherwise associate a savings account in conjunction with applying for a line of credit that can be used for medical expenses. For instance, via the enrollment system, the user 202 may provide routing and account information associated with an existing savings account of the user 202 or information associated with an existing HSA. The enrollment system may access the financial institution associated with the user's savings account to verify that the routing and account information is accurate and that the corresponding account is associated with the user 202. The enrollment system may associate the user's savings account information with the line of credit and/or the selected coverage plan via the payment instrument 220, which may be issued to the user 202. The enrollment system may update an entry corresponding to the user 202 within an internal database or other database associated with the enrollment system (e.g., maintained by an enrollment service that implements the enrollment system, etc.) to associate the user's savings account with the line of credit and/or coverage plan.

In an embodiment, if the user 202 does not have an existing savings account, the enrollment system can provide the user 202 with an option to establish a savings account with a financial institution associated with the enrollment system. For instance, the enrollment system may provide the user 202 with different savings account options provided by one or more financial institutions. These options may correspond to different savings interest rates, minimum account balances, and the like. If the user 202 selects a particular savings account option, the enrollment system may interact with the financial institution associated with the selected savings account option to establish a savings account for the user 202. The user 202, via the enrollment system, may provide an amount for initial deposit into the savings account, which may be processed by the financial institution and deposited into the user's account. The enrollment system may associate this new savings account with the user's line of credit and/or medical coverage plan, as described above.

In an embodiment, via the enrollment system, the user 202, can set up a savings account, apply for a line of credit, and apply for a medical coverage plan in a single interaction. This process may incorporate the various operations described above, whereby the enrollment system may interact with a coverage provider, a credit provider, and a financial institution to provide the user 202 with different coverage plan options, credit options, and savings account options, without exposing any sensitive information between the different providers, as described above.

It should be noted that the enrollment system may allow a user 202 to apply for a medical coverage plan, apply for a line of credit, or establish a savings account independently. For example, at step 216, a user 202 can use the enrollment system to establish a savings account without applying for either a coverage plan or a line or credit. For example, via the enrollment system, the user 202 may submit a request to establish a new savings account or associate an existing savings account with a payment instrument 220 that can be used for medical expenses at a point-of-sale. The point-of-sale, in the medical context, may include a hospital, doctor's office, pharmacy, and the like. As noted above, the embodiments described herein may also be applicable to automobile coverage, home coverage, travel coverage, renters' coverage, life coverage, and the like. In these contexts, the point-of-sale, thus, may include any location where a user's coverage may be invoked (e.g., automobile repair shop, apartment manager's office, travel agent's office, etc.).

In response to the request, the enrollment system may determine, at step 218, whether the user 202 wishes to associate a medical coverage plan with the savings account. For instance, the enrollment system 202 may prompt the user to indicate whether it wishes to associate a medical coverage plan with the savings account and, if so, to provide its medical coverage plan information for association with the savings account. In an embodiment, the enrollment system provides the user 202 with an opportunity to apply for a coverage plan, as described above in conjunction with step 208.

Once the user 202 has been issued a payment instrument 220 that incorporates data usable to identify the user's medical coverage plan, the user's line(s) of credit, and/or the user's savings account, the user 202 may initiate a transaction process 206 by seeing a doctor or otherwise engaging in an action that requires presentation of medical coverage plan information (e.g., visits a hospital for a medical procedure, obtains a prescription from a pharmacy, etc.). For instance, the user 202 may present its payment instrument 220 at a point-of-sale, which is used to determine the user's medical coverage and to reduce the patient responsibility based on the user's medical coverage. For instance, a first transaction using the provided payment instrument 220 can be used identify policy data and coverage in real-time (reducing the user's out-of-pocket costs) and allow the user 202 to determine the remaining balance. As an illustrative example, when the user 202 presents its payment instrument 220, a coverage provider system associated with the coverage plan may access a patient database, a policy database, and pricing tables to determine the user's coverage and, based on the aforementioned information, the user's patient responsibility. The user's patient data can be identified by the system automatically and/or in real-time with presentation of the payment instrument 220 (e.g., swipe, key entry, scan, etc.) at the point-of-sale (e.g., doctor's office, hospital, pharmacy, etc.). The policy database is used to determine whether the user 202 has medical coverage and the extent of the medical coverage or determine if further review of the medical claim is required. Pricing tables can be used to determine patient (e.g., user 202) responsibility (e.g., to adjudicate claims in real-time). Based on this evaluation, the coverage provider system may determine the remaining balance that is not covered by the user's medical coverage and present the user 202 with the remaining balance at the point-of-sale. For instance, at a point-of-sale, the coverage provider system may display, to the user 202, the remaining balance that is to be paid for the medical expense.

Based on the remaining balance presented to the user 202, the user 202 may determine whether to pay this remaining balance using one or more lines of credit and/or its savings account (e.g., HSA, etc.). For instance, at the point-of-sale, the user 202 may be presented with an option to utilize the line of credit, the savings account, or any other form of payment associated with the payment instrument 220. For instance, a payment system at the point-of-sale may utilize the data included in the payment instrument 220 to identify the user's various accounts associated with the coverage plan utilized by the user 202 at the point-of-sale. The payment system may present various payment options corresponding to these various accounts to the user 202. The user 202 may select, from these payment options, one or more payment options for payment of the remaining balance. For instance, the user 202 may indicate, at step 224, that the remaining balance is to be paid using its line of credit. Alternatively, the user 202 may indicate that the remaining balance is to be paid using its savings account. In some instances, the user 202 may forego using any of the payment options associated with the payment instrument 220 and instead present an alternative form of payment (e.g., a credit card, a debit card, etc.) for payment of the remaining balance.

In an embodiment, the payment system determines whether the user 202 can cover the remaining balance not covered by the medical coverage plan with an existing savings account and/or with cash (e.g., fiat currency, from the user's bank account, etc.). For instance, the payment system may access the user's savings account to determine whether the funds maintained in the account are sufficient to cover the remaining balance. Alternatively, the user 202 may opt to access its savings account to pay the remaining costs not covered by the medical coverage plan. Alternatively, the user 202 may determine that it will pay these remaining costs using cash or a line of credit (e.g., credit card). If it is determined that the savings account may be used to cover the remaining costs, the user 202 may be provided with an option to utilize its savings account to cover the remaining balance. In some instances, the payment system may provide the user 202 with an option to pay these remaining costs using cash (e.g., fiat currency, a credit card associated with a different line of credit, etc.). If the user 202 can cover the remaining balance using its savings account and/or with cash, the user 202 may opt to pay the outstanding balance with cash and/or with an amount from its savings account at the point-of-sale (e.g., doctor's office, hospital, pharmacy, etc.).

If the user 202 cannot cover the remaining balance with its savings account or wishes to use the line of credit associated with the payment instrument 220 to cover the remaining balance, the user 202 may opt to pay the outstanding balance with its line of credit. For instance, the user 202 may provide the payment instrument 220 at the point-of-sale (e.g., doctor's office, hospital, pharmacy, etc.) to apply the remaining balance to the line of credit associated with the payment instrument 220. In some instances, the user 202 may opt to pay the remaining costs using any combination of its savings account, cash, and the line of credit associated with the payment instrument 220. As an illustrative example, the user 202 may indicate that the savings account may be used to pay for a portion of the remaining balance and that the remainder is to be paid using other payment methods. The user 202, thus, may opt to pay this portion of the remaining balance with its savings account and the remaining portion with a combination of cash and its line of credit associated with the payment instrument 220. This may allow the user 202 to tailor payment of any remaining medical expenses to its financial needs.

It should be noted that the payment instrument 220 may be used for any payment combinations for a particular medical expenditure. For instance, at step 222, a user 202 may utilize the payment instrument 220 to cover an existing medical expense using its medical coverage benefits. Any remaining balance may be paid by the user 202 using alternative payment methods not associated with the payment instrument 220, such as an alternative line of credit (e.g., a credit card, etc.), an alternative savings account (e.g., via a debit card or other payment instrument associated with a financial institution), or with cash. In an embodiment, if the payment system determines that the user 202 does not wish to utilize its line of credit or savings account associated with the payment instrument 220 for payment of any remaining balances, the payment system may provide a notification to the user 202 to indicate that it has the option to utilize its line of credit or savings account associated with the payment instrument 220 for payment of the remaining balances. In some instances, the payment system may provide the user 202 with one or more incentives for utilize the line of credit or savings account associated with the payment instrument 220 for payment of remaining balances. For instance, the payment system may provide the user 202 with future discounts on certain expenses, loyalty rewards points, and the like.

As another example, at step 226, the user 202 may forego using its medical coverage plan and instead use its line of credit to pay for the medical expense. For instance, via the payment system, the user 202 may indicate that it does not want to submit a claim to the coverage provider for the medical procedure or other act and instead pay for the procedure or other act outright using a line of credit or savings account associated with the payment instrument 220.

In an embodiment, the payment system determines whether the user 202 can provide payment for a remaining balance using its line of credit and/or savings account. For instance, the payment system may utilize the data from the payment instrument 220 to identify any associated lines of credit and/or savings account from which payment may be derived. The payment system may query the credit providers and/or financial institutions associated with the lines of credit and/or savings account to determine whether the remaining balance may be paid using these payment options. In an embodiment, if the payment system determines that the user 202 cannot cover the remaining balance using any combination of payment options associated with the payment instrument 220, the payment instrument can present the user 202, at the point-of-sale, with an option to apply for a credit limit increase for an existing line of credit associated with the payment instrument 220 or to apply for a new line of credit that can be associated with the payment instrument 220. For instance, similar to the credit application process described above, using information associated with the user 202 (e.g., birthdate, last four digits of a Social Security number, etc.), the payment system may perform a soft inquiry of the user's credit report to determine whether the user 202 can be pre-approved for a credit limit increase on an existing line of credit or for a new line of credit that can be used for medical expenses. If the user 202 opts to apply for a credit limit increase or for a new line of credit, the application for the credit limit increase or for the new line of credit can be provided to a credit provider, which may evaluate the application to determine whether the user 202 is approved for the credit limit increase or for a new line of credit. If the user 202 is approved, the credit provider may determine the amount of this line of credit. If the user 202 is approved for a credit limit increase or for a new line of credit, the user 202 may be provided with a notification, via the payment system, of the credit limit increase or the new line of credit. This credit limit increase or new line of credit can be automatically associated with the payment instrument 220 by the payment system via the aforementioned user database. The user 202 may use the newly available credit to cover the remaining balance at the point-of-sale.

In an embodiment, once the remaining balance has been paid using the payment instrument 220, if the payment system determines, based on a determination by the coverage provider for the particular medical procedure or other act, that a post-transaction adjudication process is required, the payment system transmits an invoice to the coverage provider. This invoice may indicate the payment method utilized by the user 202 for payment of a balance associated with the medical procedure or other act, as well as information associated with the medical procedure or other act for which a claim has been submitted. The coverage provider may perform a post-transaction adjudication process based on the information provided by the payment system and determine whether the user 202 is due a reimbursement for payment made at the point-of-sale for the procedure or other act. If reimbursement is due to the user 202, the coverage provider may transmit this reimbursement to the account indicated in the invoice by the payment system. This allows for automatic reimbursement of any excess payments made by the user 202 at step 228.

Figure 3:
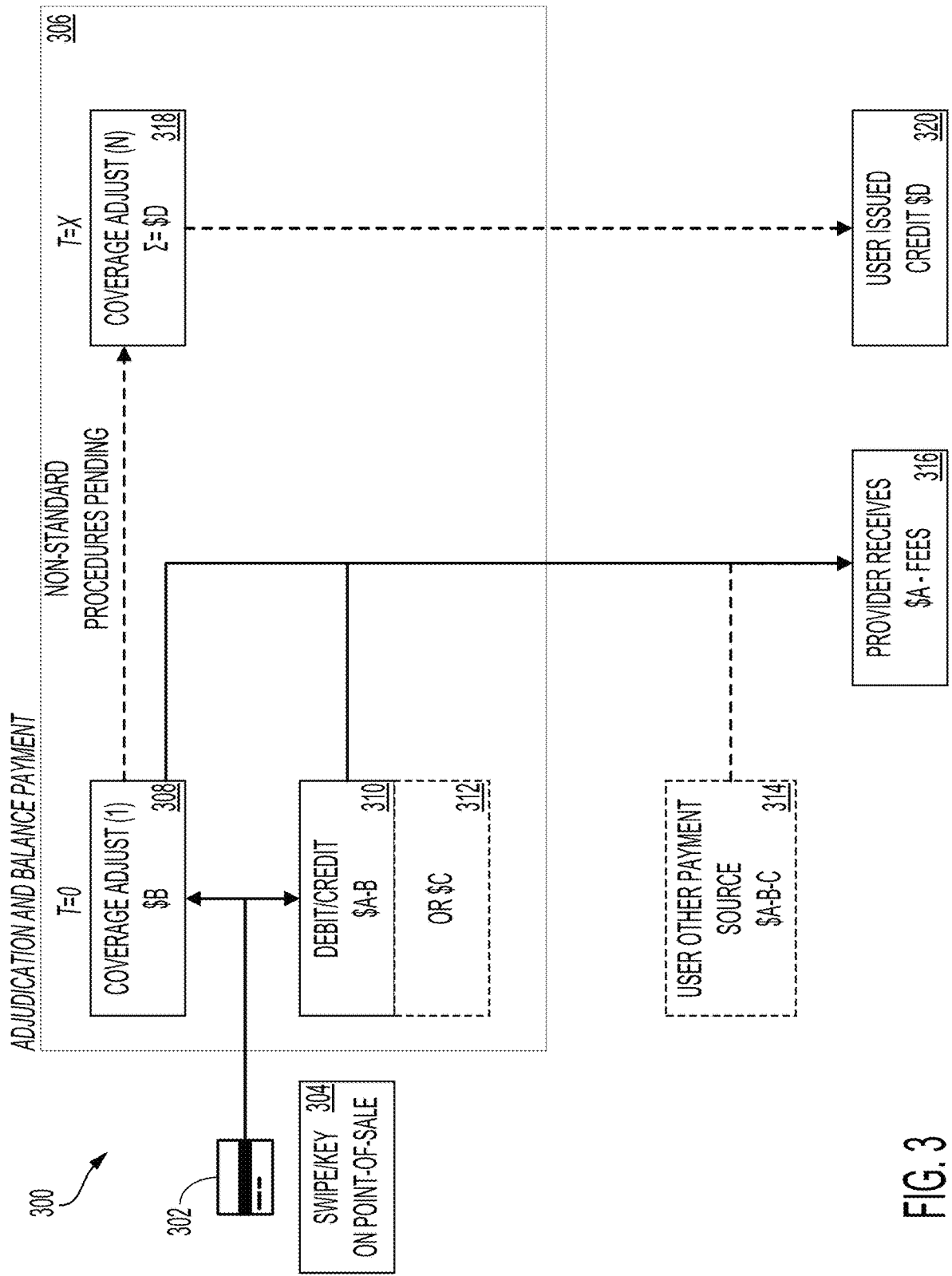
FIG. 3 shows an illustrative example of an environment in which processing of an instrument enables real-time coverage adjudication and payment processing based on the coverage adjudication in accordance with at least one embodiment.

FIG. 3 shows an illustrative example of an environment 300 in which processing of an instrument 302 enables real-time coverage adjudication and payment processing based on the coverage adjudication in accordance with at least one embodiment. In the environment 300, a user, at a point-of-sale, may utilize (e.g., swipe, manual key entry, scan, etc.) its payment instrument 302 via a payment system implemented by a payment instrument provider to submit medical coverage and payment information. The payment instrument 302 may be utilized at the point-of-sale to cover a medical procedure, treatment, or other associated act in real-time.

In an embodiment, the payment system provides a user with an invoice for a medical procedure, treatment, or other associated act at the point-of-sale. For instance, a medical administrator may input the invoice into the payment system, which may present the invoice to the user. The payment system may solicit the user to provide its payment instrument in order to retrieve any available medical coverage information that may be used to determine the user's actual outstanding balance. The user may present its payment instrument 302 to the payment system via a swipe, key entry, or other operation at step 304.

The payment system may obtain, from the payment instrument 302, data associated with the user's medical coverage plan and with the user's available line of credit or other payment options that may be used to cover any pending balances. For instance, the payment instrument 302 may include an identifier that is unique to the user, such as a payment instrument number, a username, a cryptographic key, and the like. The payment system may utilize the unique identifier to retrieve, from a user database maintained by the payment instrument provider, an entry corresponding to the user. This entry may specify particular account information associated with the user. The account information may be associated with the user's medical coverage plan, the user's line(s) of credit, the user's savings account, and the like. Thus, the payment instrument 302 may be used to identify the user's coverage benefits and the user's available payment methods.

In an embodiment, as part of the adjudication and balance payment process 306, the payment system may transmit a medical claim and account information of the user associated with a particular medical coverage plan to a corresponding coverage provider for real-time or initial adjudication. The coverage provider may evaluate the claim, as well as the user's medical coverage plan, to determine the outstanding balance that is to be paid by the user. For instance, the coverage provider may determine that the user's medical coverage plan covers a particular percentage of the expense associated with the particular procedure indicated in the claim. The coverage provider may provide, to the payment system, an indication of the user's responsibility (e.g., outstanding balance) as a result of this adjudication process. In some instances, the coverage provider may indicate that post-transaction adjudication is required (e.g., real-time adjudication of a claim cannot be performed). Thus, in these instances, the coverage provider may indicate, to the payment system, that the user is to cover the entire expense.

At step 310, the payment system provides the user with one or more payment options to cover the outstanding balance for the medical procedure, treatment, or other act. This outstanding balance may be defined as the overall cost of the claim (e.g., "$A") minus the amount covered by the user's coverage plan (e.g., "$B"). Through the payment system, the user may elect to use a line of credit associated with the payment instrument 302 and provided by a credit provider, as described above. Alternatively, the user may elect to use an existing savings account, such as an HSA or bank savings account, to cover the outstanding balance. In some instances, at step 312, rather than providing payment for the entire outstanding balance using either a line of credit associated with the payment instrument 302 or an existing savings account, the user may indicate, via the payment system, that it wishes to utilize its line of credit or savings account to cover a portion of the outstanding balance and utilize, at step 314, another payment source for the remaining portion of the outstanding balance.

As an illustrative example, the user may be provided, at the point-of-sale, with an option to utilize its line of credit and/or savings account to cover part or all of the unpaid balance. This may allow the user to determine how to allocate the unpaid balance among its savings account, its line of credit, and/or other payment methods. Further, if the user does not have sufficient funds in its savings account and line of credit, the user may determine what additional funds are required to cover any remaining unpaid balance. Thus, at the point-of-sale, the user may customize how any unpaid balance is to be paid using any of its savings account, line of credit, and other payment method. At step 316, the medical provider may receive payment (minus any applicable fees) corresponding to the medical procedure, treatment, or other act from the payment system. This payment may be aggregated by the payment system from the coverage provider and from the one or more accounts and payment methods indicated by the user at the point-of-sale.

In an embodiment, if post-transaction adjudication is required for the user's medical claim, the coverage provider may, at step 318, perform this post-transaction adjudication of the user's medical claim. The payment system may automatically provide the coverage provider with the medical claim or other invoice indicating the medical procedure, treatment, or other act for which the user's coverage plan is being invoked. Further, the medical claim or other invoice may specify the amount paid by the user at the point-of-sale, as well as the overall expense for the medical procedure, treatment, or other act. This post-transaction adjudication may be performed at a time after the user's initial transaction at the point-of-sale.

If the coverage provider determines that the user is entitled to a reimbursement of some or all of the payment submitted at the point-of-sale, the coverage provider may, at step 320, automatically issue a credit to the line of credit and/or savings account associated with the payment instrument 302. For instance, the coverage provider may transmit a reimbursement payment directly to a credit provider associated with the user's line of credit for application to the user's line of credit. If payment was made using the user's savings account, the coverage provider may automatically submit a payment to the user's financial institution that maintains its savings account to apply the reimbursement to the user's savings account. This payment may be performed electronically, such as through an electronic funds transfer (EFT), an automated clearing house (ACH), and the like. In an embodiment, if payment was made by the user using an alternative payment source not associated with the payment instrument 304, the coverage provider can submit reimbursement directly to the user, such as through a physical check or other payment instrument.

Figure 4:
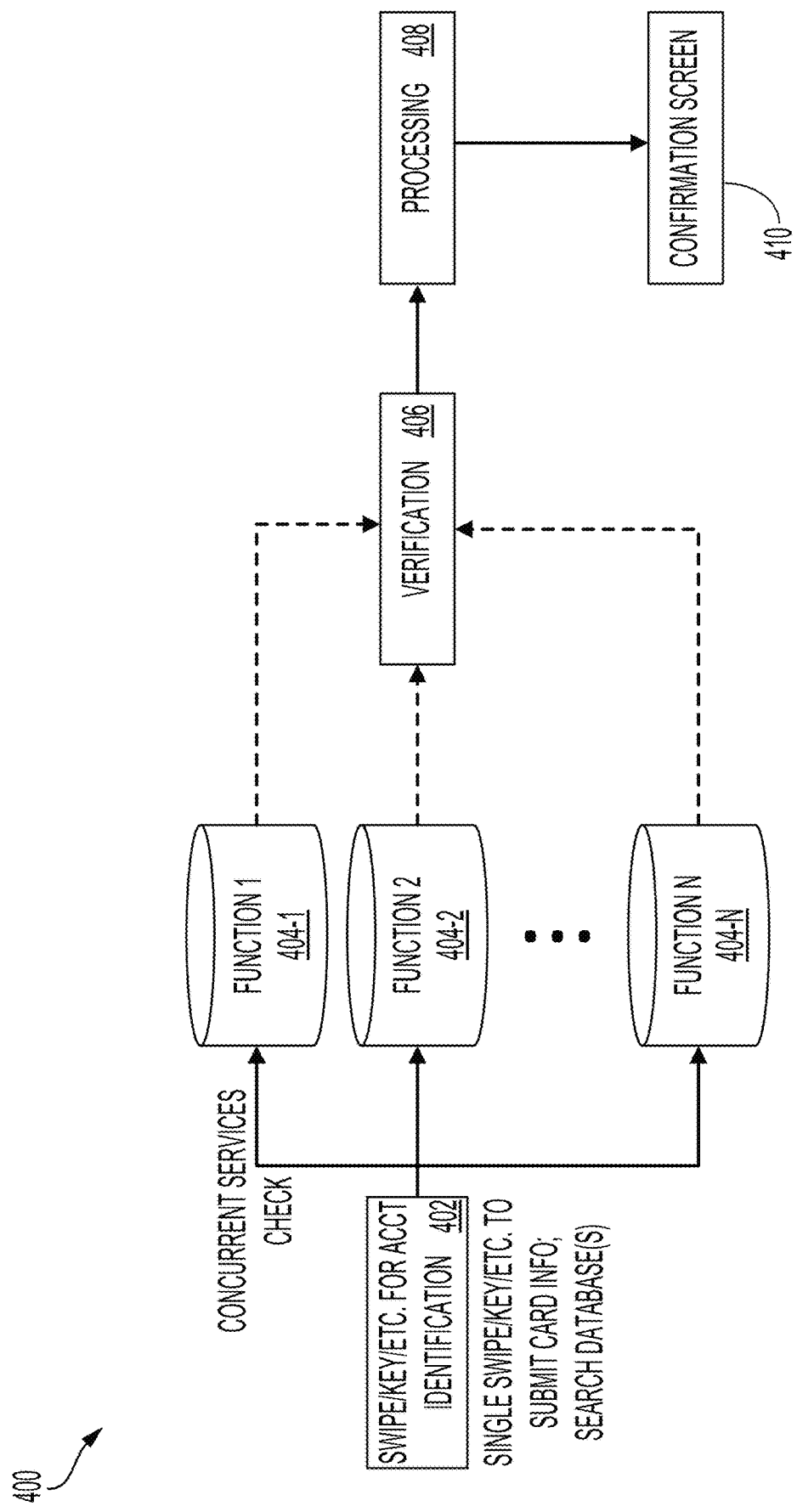
FIG. 4 shows an illustrative example of an environment in which processing of an instrument causes coordinated operations, including real-time coverage adjudication and payment processing, to be performed cohesively in accordance with at least one embodiment.

FIG. 4 shows an illustrative example of an environment 400 in which processing of an instrument causes coordinated operations, including real-time coverage adjudication and payment processing, to be performed cohesively in accordance with at least one embodiment. In the environment 400, a payment system implemented by a payment instrument provider may perform concurrent services checks at a point-of-sale to process a medical claim and a payment for said medical claim in real-time. At step 402, a payment system at a point-of-sale, detects the use (e.g., swipe, key entry, etc.) of a payment instrument by a user for account identification. As noted above, the payment instrument may include data corresponding to a user entry in a user database maintained by the payment instrument provider. The user entry may specify information corresponding the user's medical coverage plan and payment accounts (e.g., lines of credit, savings account(s), etc.).

In response to detecting use of a payment instrument by the user, the payment system may perform various functions 404-1-404-N simultaneously or in real-time to perform claim adjudication, process payments associated with a claim, retrieve account information to determine available payment sources, and the like. For example, in response to detecting use of a payment instrument, the payment system may simultaneously submit a claim corresponding to the medical procedure, treatment, or other act at the point-of-sale to a coverage provider for real-time adjudication of the claim and access the user's credit and/or savings accounts of record (e.g., associated with the payment instrument) to identify the amounts available through these accounts for payment purposes. Additionally, the payment system may provide the user, via an interface, with information associated with its medical coverage plan, with its line(s) of credit and/or savings account(s) associated with the payment instrument, and the like. As illustrated in FIGS. 7A-7F, the payment system may allow the user to dynamically perform various functions via various interfaces provided by the payment system.

In an embodiment, the output of a particular function may be reflected across other functions of the payment system. For example, if the payment system obtains, from a coverage provider, a real-time adjudication of a submitted claim, the payment system may update an interface of the payment system to indicate the outstanding balance that is to be paid by the user. Additionally, via the interface, the payment system may indicate which payment sources (e.g., line(s) of credit, savings account(s), etc.) may be used for payment of the outstanding balance. For each of these payment sources, the payment instrument may indicate the amount available for payment of the outstanding balance.

In an embodiment, if the payment system determines that the user does not have a payment source for the outstanding balance (e.g., the outstanding balance exceeds the amount available via the user's payment sources), the payment instrument may provide the user with an offer to apply for a credit limit increase or a new line of credit that can be used to cover the outstanding balance. For instance, similar to a credit application process, using information associated with the user (e.g., birthdate, last four digits of a Social Security number, etc.), the payment system may perform a soft inquiry of the user's credit report to determine whether the user can be pre-approved for a credit limit increase on an existing line of credit or for a new line of credit that can be used for medical expenses. If the user opts to apply for a credit limit increase or for a new line of credit, the application for the credit limit increase or for the new line of credit can be provided to a credit provider, which may evaluate the application to determine whether the user is approved for the credit limit increase or for a new line of credit. If the user is approved, the credit provider may determine the amount of this line of credit. If the user is approved for a credit limit increase or for a new line of credit, the user may be provided with a notification, via the payment system, of the credit limit increase or the new line of credit. This credit limit increase or new line of credit can be automatically associated with the payment instrument by the payment system via the aforementioned user database. The user may use the newly available credit to cover the remaining balance at the point-of-sale.

In some instances, the payment system may maintain generic coverage plan information that can be used to estimate the user's responsibility for a particular medical procedure, treatment, or other act. This generic coverage plan information may be provided by the coverage provider. When the user utilizes its payment instrument at the point-of-sale, the payment system may utilize the data from the payment instrument to identify information associated with the user's coverage plan. This can include an identifier of a base coverage plan that can be used for initial determination of user responsibility in real-time without performing adjudication of a medical claim at the insurance provider. The payment system may utilize the identifier to obtain the corresponding generic coverage plan information for the user and estimate the user's responsibility. In parallel, the payment system may submit the medical claim and the user's coverage plan identifier to the coverage provider, which may perform actual real-time adjudication of the medical claim and determine the actual user responsibility. This may allow the user to obtain an initial estimate of its responsibility and identify suitable payment sources (based on information presented by the payment system) while real-time adjudication of the medical claim is performed.

In an embodiment, the payment system can use data garnered through the transaction process (e.g., real-time claim adjudication and balance payment) to train or otherwise update a machine learning model or artificial intelligence that is used to provide users of the payment instrument provider with recommendations for medical coverage and credit/financing options. For instance, information regarding the medical treatment, the coverage plan utilized for the medical treatment, the types of payment options used to cover any outstanding balances, amounts associated with the medical treatment and the outstanding balances, and the like may be anonymized and used as part of a dataset of input anonymized user information for various users. This dataset of input anonymized user information may be analyzed using a clustering algorithm to identify estimated medical expenditures for certain types of users and the types of accounts that may be offered to certain types of users. Example clustering algorithms that may be trained using this dataset generated by different payment systems implemented by the payment instrument provider and usable by an enrollment system of the payment instrument provider to forecast a user's future medical expenses and recommend coverage plans, lines of credit, and/or savings accounts may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of the machine learning model or artificial intelligence, the enrollment system of the payment instrument provider may determine whether to extend a line of credit to a user, the amount of the line of credit, and whether the user should supplement their line of credit with a savings account to cover any medical expenses that may exceed the line of credit. Further, the enrollment system may provide recommendations for different coverage plans made available by a coverage provider, as described above.

At step 406, the payment system may execute a verification process, whereby the payment system may verify that the output of the various functions 404-1-404-N is accurate. For instance, as updates resulting from performance of any of the various functions 404-1-404-N, the payment system may evaluate any previously obtained information to determine whether the previously obtained information is superseded by these updates or otherwise is to be updated based on the received updates. As an illustrative example, if the payment system has provided a user with an initial estimate of the user's responsibility based on available coverage plan information and the medical treatment, procedure, etc., and the payment system obtains an adjudication from the coverage provider indicating the actual user's responsibility for the medical treatment, procedure, etc., the payment system may update an interface to provide the user with its updated user responsibility (e.g., outstanding balance) for the medical treatment, procedure, etc.

As another illustrative example, when an adjudication from the coverage provider is received, the payment system may execute a verification process 406 to determine whether there have been any changes to the user's line(s) of credit and/or savings account(s) associated with the presented payment instrument. For example, the payment system may query the credit provider and/or the savings account provider (e.g., financial institution, bank, etc.) to determine the real-time balances of the user's accounts associated with the payment instrument. These real-time balances may be used to determine whether the user is able to cover the outstanding balance using its line(s) of credit and/or savings account(s), as described above.

At step 408, the payment system may execute a processing step to complete a transaction at the point-of-sale on behalf of the user. For instance, if the user has selected, via an interface of the payment system, a particular line of credit, savings account, or other payment source for an outstanding balance, the payment system may obtain the requisite payment from the payment source. For instance, if the user specifies that its line of credit from a credit provider is to be utilized for payment of the outstanding balance, the payment provider may obtain, from the credit provider, the payment amount and apply this payment amount to the outstanding balance. Further, the payment system may obtain, from the coverage provider, the amount covered by the user's coverage plan. The payment system may aggregate these payments and deduct any applicable fees, resulting in a fulfillment amount that can be provided to the medical provider, practitioner, or other entity that submitted the original invoice for the medical treatment, procedure, etc. associated with the user. Once the processing step has been completed, the payment system may update its interface, at step 410, to provide the user with a confirmation screen indicating information associated with the transaction.

Figure 5A:
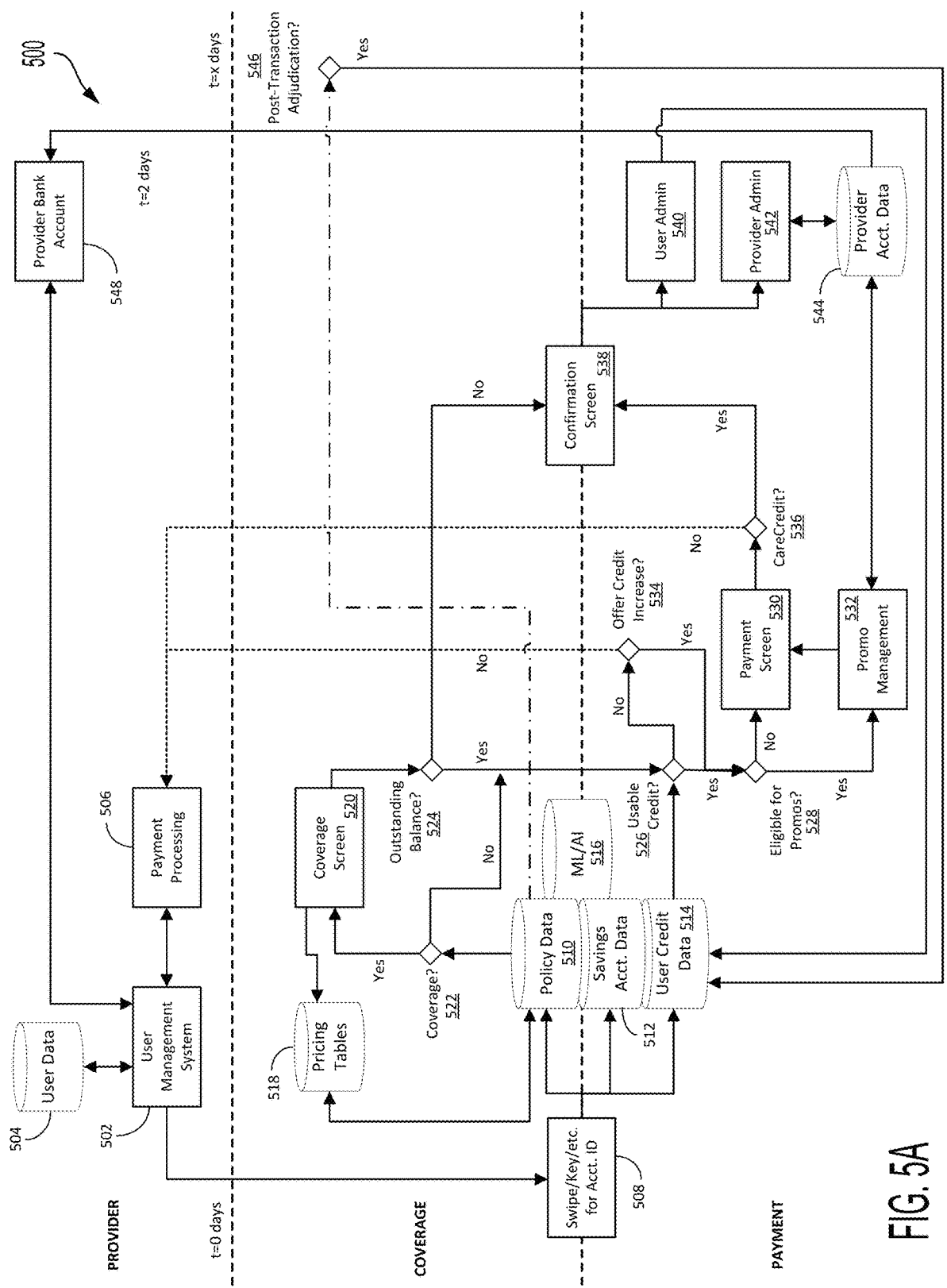
FIG. 5A shows an illustrative example of an infrastructure wherein processing of an instrument causes initiation of multiple processes and the cross-referencing of data for coverage adjudication, payment processing, coverage reimbursement and machine learning in real-time in accordance with at least one embodiment.

FIG. 5A shows an illustrative example of an infrastructure 500 wherein processing of an instrument causes initiation of multiple processes and the cross-referencing of data for coverage adjudication, payment processing, coverage reimbursement and machine learning in real-time in accordance with at least one embodiment. The infrastructure 500 may include a payment system (not shown) implemented at a point-of-sale and configured to interact with other systems, such as systems implemented by a medical provider (e.g., hospital, doctor's office, pharmacy, etc.), systems implemented by a coverage provider, and systems provided by a credit provider and/or other financial institution. It should be noted that the coverage provider and the credit provider and/or other financial institution may be separate and distinct entities. In an embodiment, the payment system may be implemented by a credit provider, which may provide lines of credit and other financing options to users. The payment system may be implemented using a standalone computer system at a point-of-sale or as an application or other executable code implemented on a computer system at the point-of-sale. For example, the payment system can be implemented at the point-of-sale using a computer system provided to a medical provider by a payment instrument provider or credit provider for the processing of payments at the point-of-sale. Alternatively, the payment system may be implemented as an application installed on a computer system maintained by the medical provider at the point-of-sale. The application may cause the computer system to establish a network connection with a payment instrument provider or credit provider system to perform the operations described herein.

It should be noted that while the payment system is described as being implemented at a point-of-sale associated with a medical provider, the payment system can be implemented in other contexts. For example, the payment system can be implemented in a point-of-sale associated with a vehicle provider (e.g., automobile repair shop, automobile dealership, etc.), whereby the payment system can interact with other systems, such as systems implemented by the vehicle provider, systems implemented by a vehicle coverage provider, and systems provided by a credit provider and/or other financial institution. As another example, the payment system can be implemented in a point-of-sale associated with a travel provider (e.g., travel agent, airline desk at an airport, etc.), whereby the payment system can interact with systems provided by the travel provider, systems implemented by a travel coverage provider, and systems provided by a credit provider and/or other financial institution. Thus, the payment system can be implemented in any point-of-sale corresponding to different types of coverage, such as home coverage, renters' coverage, life coverage, and the like.

In an embodiment, a user management system 502 implemented by a medical provider obtains user data from a user data repository 504 to obtain user information associated with a particular user. This user data may correspond to a medical procedure, treatment, or other action (e.g., a medical visit, etc.) performed by the medical provider. For instance, the user data may include identifying information of the user (e.g., user name, date of birth, patient identifier, etc.) as well as details or codes corresponding to the services provided by the medical provider. The user management system 502 may further interact with a payment processing system 506 to determine an associated expense for the services provided by the medical provider.

In an embodiment, the user management system 502 transmits the information garnered from the user data repository 504 and the payment processing system 506 to the payment system at the point-of-sale. This may cause the payment system to present to the user the current balance for the services provided by the medical provider. For instance, the payment system, in response to receiving this information from the user management system 502, may update a user interface of the payment system to present the user with the current balance for the services provided by the medical provider. Further, in an embodiment, the payment system can instruct the user to provide a payment instrument issued by the payment instrument provider. As noted above, the payment instrument may include data associated with the user's medical coverage plan and one or more payment methods (e.g., line(s) of credit, savings account(s), etc.).

Through the payment system, the user can provide its payment instrument to initiate payment of the current balance. For instance, at step 508, the user may use its payment instrument to submit account information via a single use (e.g., by swipe, manual key entry, scan, etc.). The payment system may extract the account information from the payment instrument and initiate one or more processes in real-time to provide payment for the services performed by the medical provider. For example, in an embodiment, the payment system accesses a policy data repository 510 of a coverage provider to obtain policy data associated with the user's coverage plan. The policy data repository 510 may include policy data for different policyholders, such as the aforementioned user. The account information extracted from the payment instrument may include a policy identifier of the user or other identifier that may be used to obtain the policy identifier of the user. For instance, the payment system may maintain a user database that includes entries corresponding to each user issued a payment instrument. A user entry may include policy identifiers, credit account identifiers, savings account identifiers, and other identifiers that may be associated with coverage providers, credit providers, and savings account providers. Using the account information from the payment instrument, the payment system may query the user database to identify an entry corresponding to the user of the payment instrument and obtain the individual identifiers described above.

If the payment system determines that the policy data repository 510 does not include policy data for the user, the payment system may, at step 522, determine whether the user has an existing coverage plan. For instance, the payment system may transmit a query to the coverage provider, using the policy identifier associated with the user's payment instrument, to identify an existing policy for the user. If the coverage provider determines that the user has an existing coverage plan, the coverage provider may provide policy data to the payment system, which can be stored in the policy data repository 510 for future use. The coverage provider may also provide expiration information for the coverage plan, whereby the payment system may remove the policy data associated with the coverage plan upon expiration of the coverage plan. In some instances, the coverage provider can push policy data to the payment system to update the policy data repository 510 automatically This may allow the payment system to refer to the policy data repository 510 for policy data associated with the user's coverage plan without having to access the coverage provider for the policy data.

In an embodiment, if the payment system determines that the user has an existing coverage plan, the payment system can submit a claim to the coverage provider for real-time adjudication of the claim in order to determine the user's responsibility (e.g., outstanding balance) for the services performed by the medical provider. The claim may specify details and/or coverage codes for the services provided by the medical provider and indicated by the user management system 502. The claim may further specify the current balance for the services provided, as determined using the payment processing system 506. The coverage provider may perform real-time adjudication of the claim, such as referring to one or more pricing tables 518 maintained by the coverage provider and the user's coverage plan, to determine the amount of the current balance that is to be covered by the coverage provider. The remaining amount (e.g., outstanding balance) may be provided to the payment system, which may update a coverage screen 520 of the user interface to present the user with its coverage plan details and new outstanding balance.

In an embodiment, if the payment system determines, at step 524, that the user does not have an outstanding balance after real-time adjudication of its claim, the payment system updates a confirmation screen 538 of the user interface to indicate that the user does not have an outstanding balance for the services provided by the medical provider and to prompt the user to confirm the present transaction (e.g., accepting the real-time adjudication performed by the coverage provider). If the user confirms the present transaction via the confirmation screen 538, the payment system may transmit information corresponding to the transaction to a user administrator 540 and to a provider administrator 542. The user administrator 540 may record the transaction in the user's entry in the user database. The provider administrator 542 may record the transaction within a medical provider entry corresponding to the medical provider in a provider account data repository 544. The medical provider entry may specify the amount that is to be paid to the medical provider minus any applicable fees. The provider administrator 542 may facilitate payment from the coverage provider to a provider bank account 548 for the services provided to the user, thereby completing the transaction between the user and the medical provider.

In an embodiment, if the payment system determines, at step 522, that the user does not have an existing coverage plan with the coverage provider of determines, at step 524, that the user is required to provide payment for an outstanding balance, the payment system determines, at step 526, whether the user has usable credit to cover the outstanding balance for the services provided by the medical provider. For instance, the payment system may query a user credit data repository 514 to identify one or more existing lines of credit for the user. For instance, the payment system may use the account information from the payment instrument and access the user credit data repository 514 of a credit provider to obtain data associated with the user's one or more lines of credit. The user credit data repository 514 may include credit data for different credit holders, such as the aforementioned user. The account information extracted from the payment instrument may include a credit account identifier of the user or other identifier that may be used to obtain the credit account identifier of the user. For instance, the payment system may access its user database to identify a user entry that includes credit account identifiers associated with credit providers through which the user may have line(s) of credit.

The payment system may communicate with the one or more credit providers associated with the line(s) of credit of the user to determine the remaining amounts for each of these line(s) of credit. For instance, the payment system may query each credit provider with the account identifier corresponding to the user's line of credit with the credit provider to determine the amount of credit available for the line of credit. In an embodiment, the payment system may present the available credit for each of the user's lines of credit via a user interface, such as a payment screen 530 of the payment system. This may allow the user to select one or more of its available lines of credit for payment of the outstanding balance for the services provided by the medical provider.

In an embodiment, the payment system also queries a savings account data repository 512 to identify one or more existing savings accounts (e.g., HSAs, bank savings accounts, etc.) of the user. Similar to the processes described above, the payment system may utilize the account information from the payment instrument to identify an entry corresponding to the user in the savings account data repository 512. The entry may specify savings account information associated with the user's savings accounts (e.g., routing numbers, account numbers, etc.). In some instances, the payment system may access the financial institutions associated with the user's savings accounts to identify any current savings balances. These balances may also be presented to the user via the payment screen 530 to allow the user to determine whether to use its savings accounts, either individually or in combination with one or more lines of credit, for payment of an outstanding balance.

As noted above, the payment system may be implemented by a credit provider or in association with one or more credit providers. In an embodiment, if the payment system determines that the user does not have usable credit for payment of the outstanding balance, the payment system determines, at step 534, whether to offer a credit increase or a new line of credit to the user. As an illustrative example, if the user does not have usable credit for payment of the outstanding balance, the payment system may provide the user with an offer to apply for a credit limit increase or a new line of credit that can be used to cover the outstanding balance. For instance, similar to a credit application process, using information associated with the user from the user database (e.g., birthdate, last four digits of a Social Security number, etc.), the payment system may perform a soft inquiry of the user's credit report to determine whether the user can be pre-approved for a credit limit increase on an existing line of credit or for a new line of credit that can be used for medical expenses. If the user opts to apply for a credit limit increase or for a new line of credit, the application for the credit limit increase or for the new line of credit can be provided to a credit provider, which may evaluate the application to determine whether the user is approved for the credit limit increase or for a new line of credit. If the user is approved, the credit provider may determine the amount of this line of credit. If the user is approved for a credit limit increase or for a new line of credit, the user may be provided with a notification, via the payment system, of the credit limit increase or the new line of credit. This credit limit increase or new line of credit can be automatically associated with the payment instrument by the payment system via the aforementioned user database. Alternatively, the payment instrument may update the user credit data repository 514 of the credit provider to indicate the credit limit increase or new line of credit. The user may use the newly available credit to cover the remaining balance at the point-of-sale via the payment screen 530.

In an embodiment, the payment system determines whether the usable credit for payment of the outstanding balance is associated with a preferred credit provider. For instance, if the user credit data repository 514 is maintained by the payment instrument provider independently from any credit provider, the payment system may query the user credit data repository 514 to identify any lines of credit associated with the user's payment instrument as a result of user designation of these lines of credit for use with the payment instrument. The information associated with these lines of credit may indicate the credit providers associated with these lines of credit. The payment system may determine, based on this information, whether any of the lines of credit are associated with a preferred credit provider. If not, the payment system may determine whether the user is pre-qualified for a line of credit with the preferred credit provider. If the payment system determines that the user is pre-qualified for a line of credit with the preferred credit provider, the payment system may present, to the user, an offer to apply for a new line of credit with the preferred credit provider. Further, the payment system may access a promo management system 532 to identify any promotions that the user may be eligible for if the user applies for and uses a new line of credit from the preferred credit provider. These promotions may include service discounts, loyalty rewards points, coupons, and the like.

In an embodiment, the payment system utilizes machine learning model and/or artificial intelligence 516 to determine whether to offer the user an offer to increase a credit limit for an existing line of credit, an offer to obtain a new line of credit, and/or modify its existing coverage plan. For instance, the payment system may use a machine learning model and/or artificial intelligence 516 trained using unsupervised learning techniques to provide the user with a forecast of possible medical expenditures over a period of time. The machine learning model and/or artificial intelligence 516 may use, as input, user-specific data from the policy data repository 510, the savings account data repository 512, and the user credit data repository 514, as well as information corresponding to the services provided by the medical provider, the adjudication performed by the coverage provider, and the outstanding balance owed by the user, as input to the machine learning model and/or artificial intelligence 516 to generate the forecast of possible future medical expenditures. This forecast may be presented to the user by the payment system via a user interface.

In addition to providing a forecast of possible future medical expenditures, the machine learning model and/or artificial intelligence 516 may provide recommendations for addressing these possible future medical expenditures. These recommendations may include applying for a credit limit increase or a new line of credit with a preferred credit provider associated with the payment system. Further, these recommendations may include applying for a modification to an existing coverage plan or for a new coverage plan that is likely to provide better coverage for the possible future medical expenditures. In an embodiment, the payment system facilitates interaction between the user and credit and coverage providers to apply for lines of credit and/or coverage plans, respectively, based on the provided recommendations. For instance, the payment system may redirect the user to the coverage provider to apply for a new coverage plan. The payment system may provide the coverage provider with the recommendation indicated to the user, which the coverage provider may use to garner user information and to make a determination as to whether the user is approved for the new coverage plan. Further, the coverage provider may provide pricing for the new coverage plan. Similarly, the payment system may redirect the user to the credit provider to apply for an increase to an existing line of credit or for a new line of credit in accordance with the provided recommendation.

If the user does not have usable credit associated with the payment instrument for the outstanding balance and is not qualified for a credit limit increase for an existing line of credit, the payment system may transmit a notification to the payment processing system 506 of the medical provider to indicate that payment of the outstanding balance is to be paid to the medical provider directly. For instance, the payment system may instruct the user to provide another method of payment to the medical provider for payment of the outstanding balance.

However, if the payment system determines that the user has available usable credit for payment of the outstanding balance or the user has been approved for a credit limit increase for an existing line of credit, the payment system may determine, at step 528, whether the user is eligible for any promotions. For instance, the payment system, based on information from the user's account, may determine whether the user is eligible for a discount for the provided services. Additionally, or alternatively, the payment system may determine whether the user is eligible to earn additional loyalty rewards points or to use coupons for the services rendered by the medical provider. In some instances, the medical provider may provide its own promotions (e.g., discounts, etc.) for certain services, which may be administered by a promo management system 532. The payment system may determine whether the user is eligible for any of these promotions based on the services performed by the medical provider.

If the user is eligible for one or more promotions, the payment system may transmit a request to the promo management system 532 to apply the one or more promotions to the user's outstanding balance. For instance, the promo management system 532 may identify the one or more promotions and apply any adjustments to the outstanding balance based on these one or more promotions. If discounts are applied to the outstanding balance, the promo management system 532 may update the medical provider entry corresponding to the medical provider in a provider account data repository 544 to indicate the application of these discounts, reducing the balance owed to the medical provider. Thus, when the provider administrator 542 determines the amount to be provided to the provider bank account 548 for the services rendered to the user, the provider administrator 542 may obtain the updated amount from the provider account data repository 544.

Once the promo management system 532 has applied any applicable promotions to the outstanding balance, or as a result of a determination that the user is not eligible for any promotions, the payment system may update the payment screen 530 to present the user with the remaining balance for which payment is required at the point-of-sale. The payment screen 530 may indicate the remaining balance, as well as various options for payment of the remaining balance. These options may include any available lines of credit and/or savings accounts identified by the payment system via the savings account data repository 512 and the user credit data repository 514.

Through the payment screen 530, the user may select one or more forms of payment for the remaining balance. For instance, the user may select a line of credit or savings account associated with the payment instrument issued by the payment instrument provider. Alternatively, the user may specify that it wishes to use an alternative form of payment (e.g., other credit card, other debit card, etc.). Thus, at step 536, the payment system determines whether the user has elected to pay the outstanding balance using a line of credit or savings account associated with the used payment instrument. If the user has elected to utilize an alternative form of payment, the payment system may transmit a notification to the payment processing system 506 of the medical provider to indicate that payment of the outstanding balance is to be paid to the medical provider directly. For instance, the payment system may instruct the user to provide the alternative form of payment to the medical provider for payment of the outstanding balance.

If the user has elected to utilize a line of credit or savings account associated with the payment instrument submitted at step 508, the payment system may update the user interface to provide a confirmation screen 538 to the user. Through the confirmation screen 538, the payment system may indicate to the user the outstanding balance that is to be paid using the selected line of credit and/or savings account. This may include indicating any new balances to the user's line of credit and/or savings account after the outstanding balance has been paid. If the user is unsatisfied with the current transaction, the user may modify allocations to the specified methods of payment or select one or more additional or alternative methods of payment for the outstanding balance.

If the user confirms the present transaction via the confirmation screen 538, the payment system may transmit information corresponding to the transaction to a user administrator 540 and to a provider administrator 542. The user administrator 540 may record the transaction in the user's entry in the user database. The provider administrator 542 may record the transaction within a medical provider entry corresponding to the medical provider in a provider account data repository 544. The medical provider entry may specify the amount that is to be paid to the medical provider minus any applicable fees. The provider administrator 542 may facilitate payment from the coverage provider and from the payment sources (e.g., credit provider, financial institution, etc.) designated by the user to a provider bank account 548 for the services provided to the user, thereby completing the transaction between the user and the medical provider.

In some instances, post-transaction adjudication 546 of a pending claim may be required by the coverage provider. For instance, when the payment system accesses the policy data repository 510 to identify the user's coverage plan, the payment system may determine that post-transaction adjudication is required for the services provided by the medical provider. As such, the payment system may automatically transmit a claim to the coverage provider detailing the services performed by the medical provider, any payments submitted by the user at the point-of-sale, and account information associated with a line of credit and/or savings account used to make the aforementioned payments.

If the coverage provider determines that a reimbursement is to be issued to the user for the services rendered by the medical provider, the coverage provider may use the account information provided by the payment system to automatically submit a reimbursement to the user's line of credit or savings account. For example, the coverage provider may provide a payment to the payment system, along with an identifier corresponding to the transaction between the user and the medical provider via the payment system. The payment system may identify the line of credit or savings account that was originally used by the user to provide payment for the services rendered by the medical provider. The payment system may automatically apply this reimbursement to the line of credit or savings account utilized by the user, thereby automatically replenishing the user's account.

In an embodiment, if the payment system receives a reimbursement from the coverage provider, the payment system may transmit a notification to the user to indicate that the reimbursement has been received. Through the payment system, the user may indicate how the reimbursement is to be disbursed to the user. For instance, the user may indicate that the reimbursement is to be applied to a user's existing line of credit and/or savings account. Alternatively, the user may specify an alternative account (e.g., bank account, etc.) to which the reimbursement is to be deposited. The user may further specify that the reimbursement is to be provided to the user itself, such as via a physical check or other financial instrument (e.g., gift card, debit card, etc.). In an embodiment, if the payment system determines that the user has not established a savings account for medical expenses (e.g., HSA, etc.), the payment system can provide an option to the user to establish a new savings account using the amount from the reimbursement.

Figure 5B:
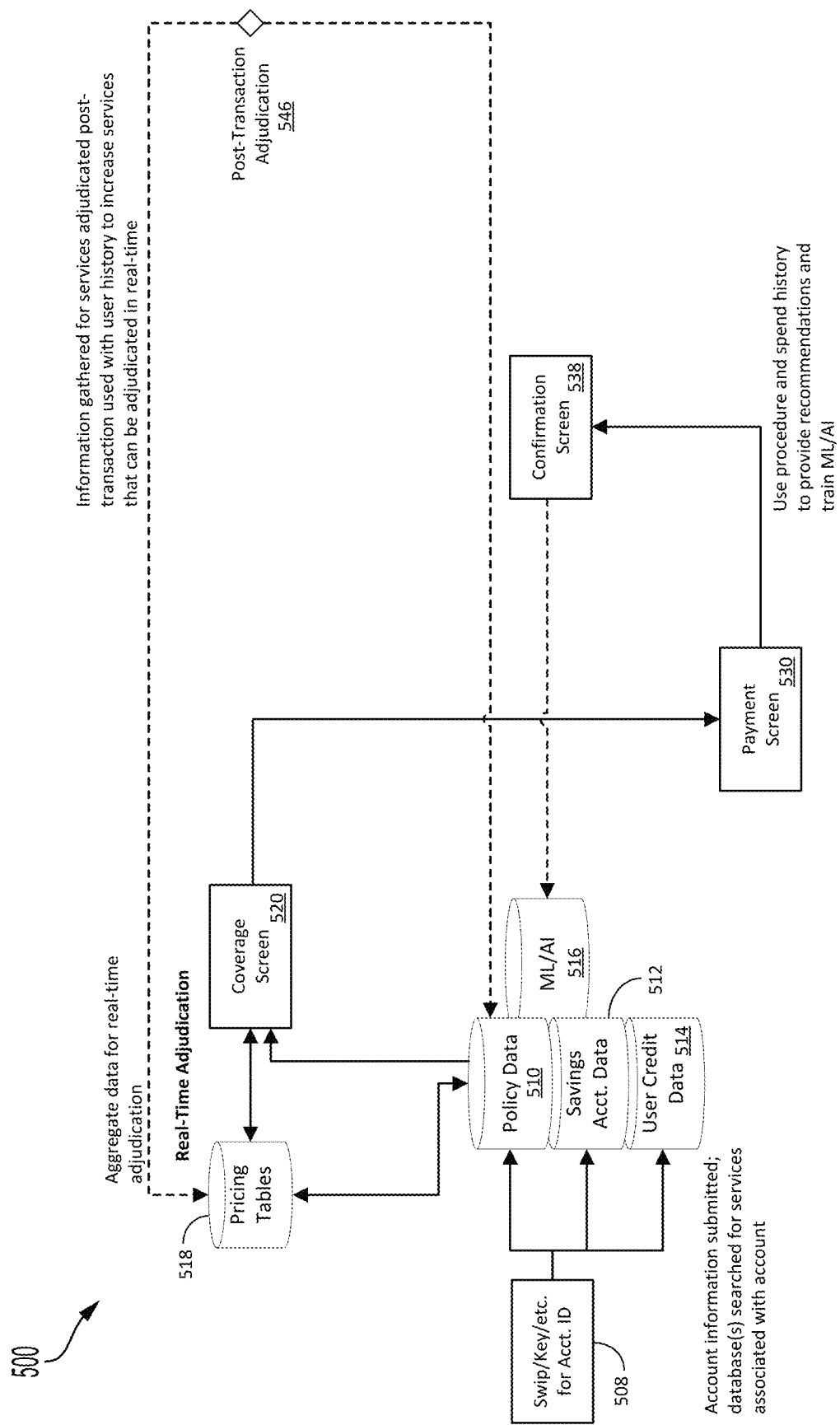
FIG. 5B shows an illustrative example of an infrastructure wherein sample data points are collected at various stages and are aggregated for machine learning or artificial intelligence training in accordance with at least one embodiment.

FIG. 5B shows an illustrative example of a portion of the infrastructure 500 illustrated in FIG. 5A, wherein sample data points are collected at various stages and are aggregated for machine learning or artificial intelligence training in accordance with at least one embodiment. As noted above, the payment system may utilize a machine learning model or artificial intelligence 516 to determine whether to offer a user an offer to increase a credit limit for an existing line of credit, an offer to obtain a new line of credit, and/or modify its existing coverage plan. For instance, the payment system may use contemporaneous and history data associated with the user as input to the machine learning model or artificial intelligence 516 to identify recommendations that can be provided to the user at the point-of-sale via the confirmation screen 538.

In an embodiment, the payment system obtains, from the policy data repository 510, data corresponding to the user's historical use of its coverage plan for medical services. This data may include details corresponding to the medical services performed, the properties of the coverage plan utilized by the user for these medical services, and results of adjudications stemming from these medical services and performed by the coverage provider. Further, the payment system may obtain, from the savings account data repository 512 and the user credit data repository 514, historical data corresponding to expenditures made by the user to provide payment for corresponding medical services identified from the policy data repository 510. This data may be aggregated with the contemporaneous data corresponding to the medical services performed by a medical provider, the one or more methods of payment selected by the user, and any adjustments to the outstanding balance made by the coverage provider via real-time adjudication. The resulting dataset may be used as input to the machine learning model or artificial intelligence 516 to identify possible recommendations that may be provided to the user for supplementing its existing line of credit, savings account, and/or coverage plan for potential future medical expenses.

As noted above, the machine learning model or artificial intelligence 516 may be trained using unsupervised learning techniques. For instance, a dataset of input user information for various users (including, but not limited to, medical expenses per user over a particular period of time, demographic information per user, etc.) may be analyzed using a clustering algorithm to identify estimated medical expenditures or coverage usage for certain types of users. Example clustering algorithms that may be trained using this dataset maintained by a coverage provider to forecast a user's future medical expenses and recommend coverage options may include k-means clustering algorithms, FCM algorithms, EM algorithms, hierarchical clustering algorithms, DBSCAN algorithms, and the like.

In an embodiment, the resulting dataset used by the payment system to obtain recommendations for the user can also be used to train the machine learning model or artificial intelligence 516 for use in identifying possible coverage plans and/or lines of credit and savings accounts that can be recommended to new users via an enrollment process. For instance, an enrollment system may use the machine learning model and/or artificial intelligence 516 to identify the one or more coverage plans that may be offered to a new user. For instance, as part of an application process, the enrollment system may process the information provided by the new user (e.g., demographic information, salary information, medical history, etc.) as input to the machine learning model or artificial intelligence 516 to predict the new user's future medical coverage needs and provide recommendations for different coverage plans for its needs.

In an embodiment, the machine learning model and/or artificial intelligence 516 can also be implemented to provide real-time adjudication of claims on behalf of the coverage provider. For instance, the payment system may process the user's policy data and information corresponding to the services provided by the medical provider to the user as input to the machine learning model and/or artificial intelligence 516 to perform real-time adjudication of the user's claim. If the payment system obtains a response from the machine learning model and/or artificial intelligence 516 indicating an outstanding balance or other information that may be used to determine the user's outstanding balance (e.g., an amount covered by the user's coverage plan, etc.), the payment system may update the payment screen 530 to provide an indication of the user's outstanding balance. However, if the machine learning model and/or artificial intelligence 516 indicates that post-transaction adjudication 546 is required, the payment system may update the payment screen 530 to indicate that full payment is required for the services provided by the medical provider. It should be noted, however, that the payment system may still automatically submit a claim, as well as any information associated with the payment submitted by the user, to the coverage provider for post-transaction adjudication, as described above.

In an embodiment, the payment system can aggregate data gathered for services adjudicated post-transaction along with user history to increase the services that can be adjudicated in real-time using the machine learning model or artificial intelligence 516. For instance, as post-transaction adjudication data is received from the coverage provider, the payment system may use the post-transaction adjudication data, along with data corresponding to the services performed and policy data corresponding to coverage plans invoked for post-transaction adjudication, to train the machine learning model or artificial intelligence 516 to perform real-time adjudication of similar coverage claims, as described above. Through real-time adjudication, the payment system may provide users with policy information, the results of the real-time adjudication, and any outstanding balance information as determined using the pricing tables 518 and policy data via the coverage screen 520. This allows users to quickly determine outstanding balances and access a payment screen 530 of the payment system to provide payment for the outstanding balances. Once a payment method has been selected, the payment system may provide a confirmation screen 538 that the user may utilize to confirm payment of the outstanding balance using the selected payment method, as described above.

Figure 6:
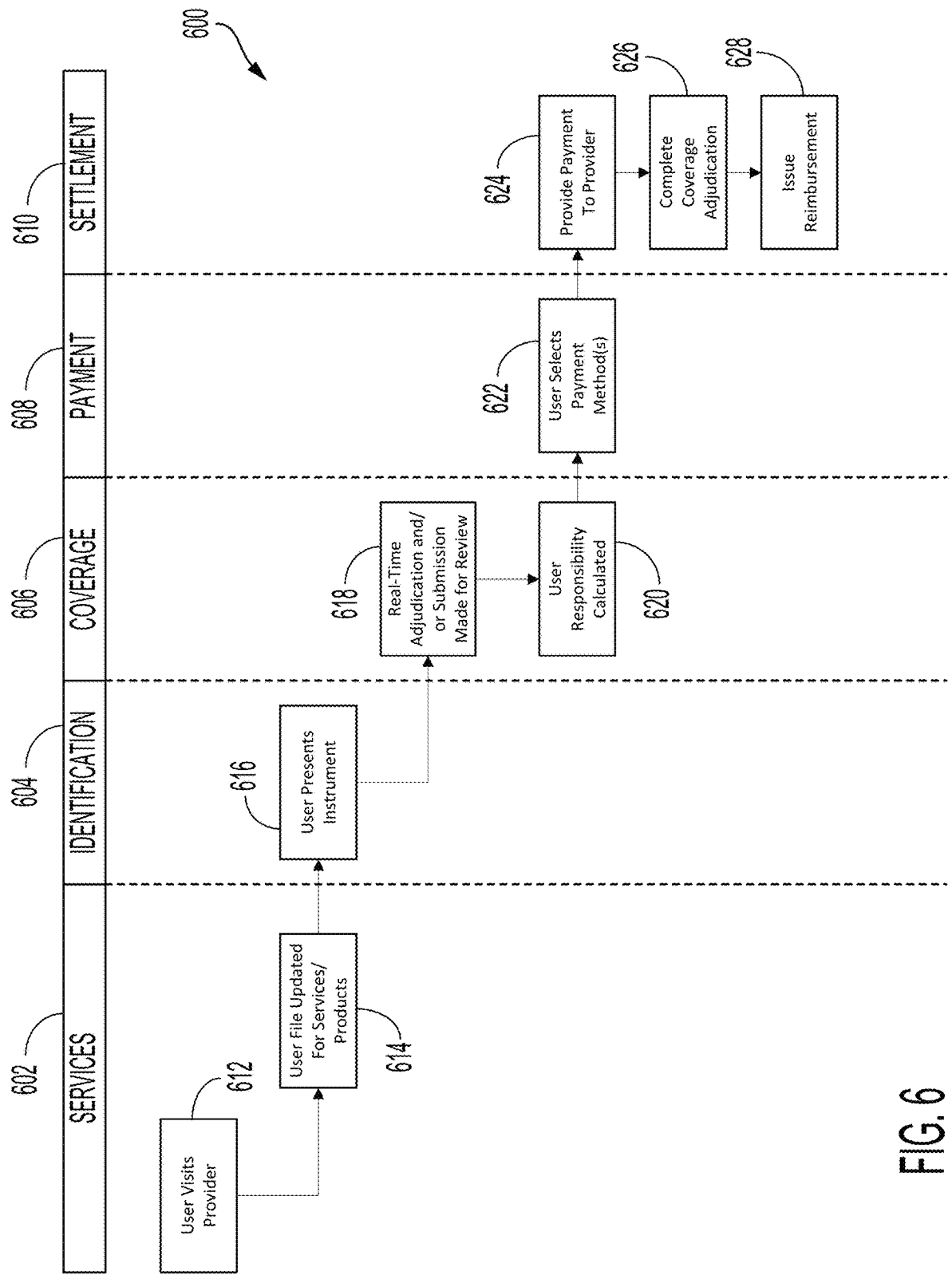
FIG. 6 shows an illustrative example of a flowchart corresponding to a transaction whereby an instrument is processed for coverage adjudication and payment processing in accordance with at least one embodiment.

FIG. 6 shows an illustrative example of a flowchart 600 corresponding to a transaction whereby an instrument is processed for coverage adjudication and payment processing in accordance with at least one embodiment. The flowchart 600 may include a services process 602, whereby one or more services may be provided to users associated with a payment instrument provider. These one or more services may include medical services for which users may utilize coverage plan benefits to reduce their payment obligation for these medical services. For instance, at step 612, a user may visit a medical provider for one or more medical services (e.g., medical procedures, medical treatments, physician consultations, prescription services, etc.). The medical provider, at step 614, may update the user's medical file to indicate the services and/or products rendered to the user during the visit.

Once the services process 602 has been completed, an identification process 604 may be performed. For instance, a payment system at the point-of-sale may receive, from a user management system of the medical provider, information corresponding to the services and/or products rendered to the user during the visit. This information may specify the services and/or products rendered, as well as a balance due for these services and/or products. The user, via the payment system, may be presented with this balance. Further, the payment system may prompt the user to provide its coverage plan information and/or payment instrument for the balance. At step 616, the user may present its payment instrument to the payment system (e.g., by swipe, manual key entry, scan, etc.).

The payment system, in response to user presentation of the payment instrument, may initiate a coverage process 606, through which the payment system may perform, at step 618, real-time adjudication of the user's coverage claim and/or submit the coverage claim for post-transaction adjudication. As described above, the payment system may use a machine learning model and/or artificial intelligence to provide real-time adjudication of claims on behalf of the coverage provider. For instance, the payment system may process the user's policy data and information corresponding to the services provided by the medical provider to the user as input to the machine learning model and/or artificial intelligence to perform real-time adjudication of the user's claim. If the payment system obtains a response from the machine learning model and/or artificial intelligence indicating an outstanding balance or other information that may be used to determine the user's outstanding balance (e.g., an amount covered by the user's coverage plan, etc.), the payment system may determine that the user is responsible for the outstanding balance. However, if the machine learning model and/or artificial intelligence indicates that post-transaction adjudication is required, the payment system may determine that the user is required to provide full payment for the services provided by the medical provider. It should be noted, however, that the payment system may still automatically submit a claim, as well as any information associated with the payment submitted by the user, to the coverage provider for post-transaction adjudication. Thus, using the machine learning model or artificial intelligence, the payment system may, at step 620, calculate the user's responsibility at the point-of-sale.

Once the coverage process 606 has been completed, the user may perform, via the payment system, a payment process 608, whereby the user, at step 622, selects one or more payment methods for the outstanding balance. For instance, the payment system may identify one or more lines of credit and/or savings accounts associated with the payment instrument presented at step 616 and as described above. The payment system may present these one or more lines of credit and/or savings accounts as payment options for the outstanding balance. Further, the payment system may provide the user with an option to select one or more alternative methods of payment (e.g., a different credit card, debit card, savings account, etc.).

The payment system may initiate a settlement process 610 in response to user selection of one or more payment methods for the outstanding balance. For instance, at step 624, the payment system may provide payment to the medical provider. This payment may include any amounts covered by the coverage provider based on the user's coverage plan, as well as any amounts from the user's designated payment methods for the outstanding balance. In an embodiment, if post-transaction adjudication is required for the user's coverage claim, the payment system automatically transmits a claim to the coverage provider detailing the services performed by the medical provider, any payments submitted by the user at the point-of-sale, and account information associated with a line of credit and/or savings account used to make the aforementioned payments.

The coverage provider may, at step 626, complete coverage adjudication for the user's coverage claim and determine whether the user is due any reimbursement for payment made at the point-of-sale. If the coverage provider determines that a reimbursement is to be issued to the user for the services rendered by the medical provider, the coverage provider may use the account information provided by the payment system to automatically issue a reimbursement to the user's line of credit or savings account at step 628. For example, the coverage provider may provide a payment to the payment system, along with an identifier corresponding to the transaction between the user and the medical provider via the payment system. The payment system may identify the line of credit or savings account that was originally used by the user to provide payment for the services rendered by the medical provider. The payment system may automatically apply this reimbursement to the line of credit or savings account utilized by the user, thereby automatically replenishing the user's account.

Figure 7A:
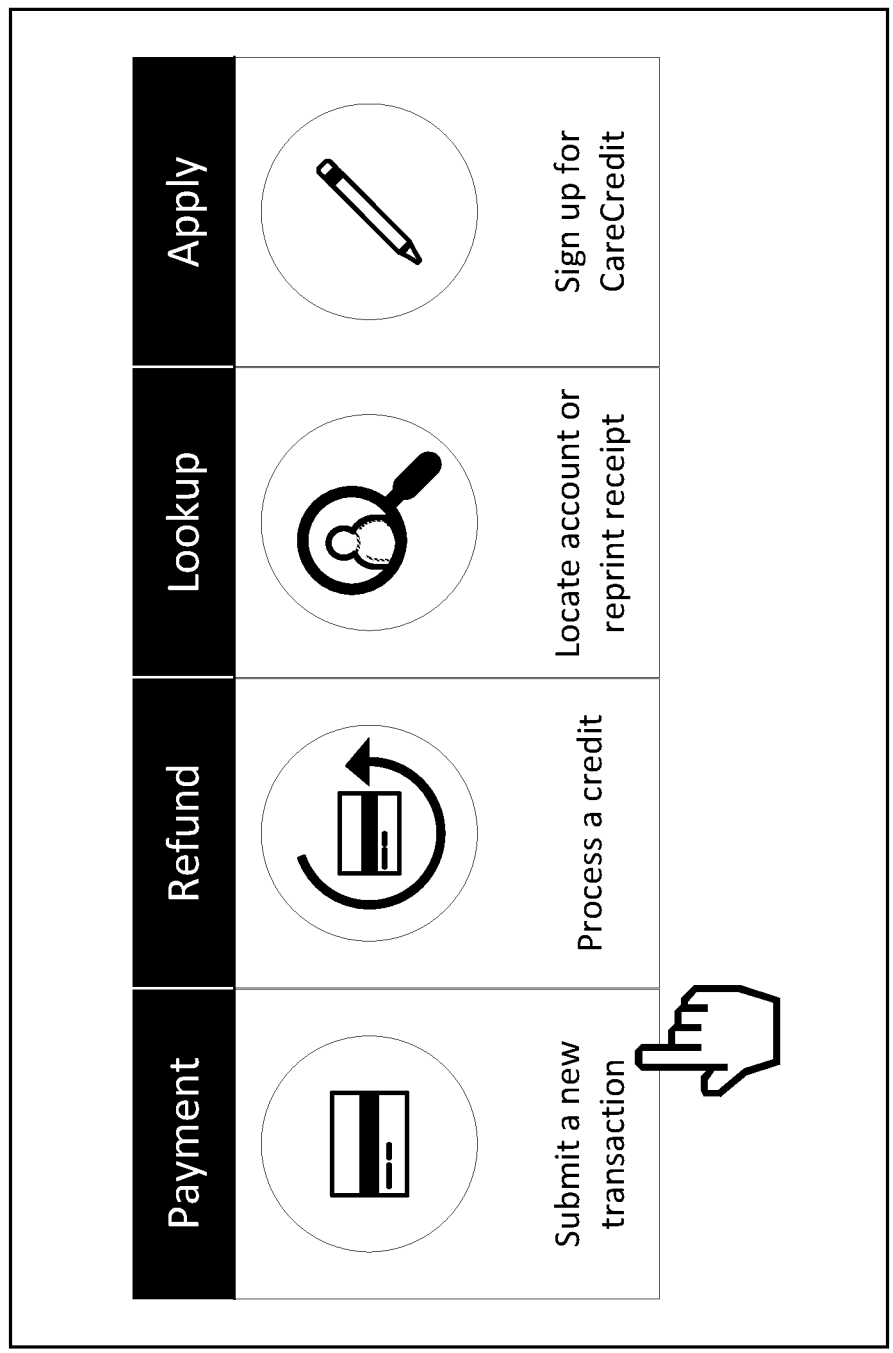

FIGS. 7A-7F show illustrative examples of an interface of a payment system configured to process an instrument for coverage adjudication and payment processing in accordance with at least one embodiment. As illustrated in FIG. 7A, a provider interface may be used by an office administrator to initiate a transaction through a single use of a payment instrument that stores thereon data corresponding to a user's coverage plan and to available payment methods. Through the interface, a medical provider may select to submit a new transaction, process a credit, locate an account, and/or reprint a receipt. Further, via the interface, a user may elect to apply for a line of credit provided by a preferred credit provider associated with the payment system.

Figure 7B:

As illustrated in FIG. 7B, a user or medical provider may utilize the interface provided by the payment system to enter user details, such as the user's name, account number, and instrument identifier. In an embodiment, this information may be automatically presented via the interface based on data obtained from the user's payment instrument. For instance, the payment system may utilize the data from the user's payment instrument to query a policy data repository, a savings account data repository, and a user credit data repository, to identify any entries corresponding to the user's medical coverage plan and any payment accounts (e.g., lines of credit, savings accounts, etc.). The payment system may utilize this information to supplement the interface and provide the user or medical provider with the required account information.

As illustrated in FIG. 7C, the interface may be updated to automatically provide coverage plan information and to determine real-time adjudication for medical services or products rendered to the user. For instance, using a machine learning model or artificial intelligence, the payment system can process the present invoice for medical services or products, as well as the user's coverage plan details, as input to the machine learning model or artificial intelligence to obtain a real-time adjudication for the invoice. Via the interface, the payment system can provide a user or medical provider with the outstanding balance for each of the services and/or products rendered to the user. In an embodiment, the machine learning model or artificial intelligence can further be used to recommend further coverage plans, perform cross-marketing for other services, and the like. Data corresponding to particular products and services provided, as well as coverage information, may be aggregated to and processed using the machine learning model or artificial intelligence to obtain outputs corresponding to users and that can be used to provide other recommendations. For example, if the services provided indicate hip dysplasia and a large number of similarly situated users are seen with those symptoms, preventative treatments may be recommended to the user.

Figure 7D:
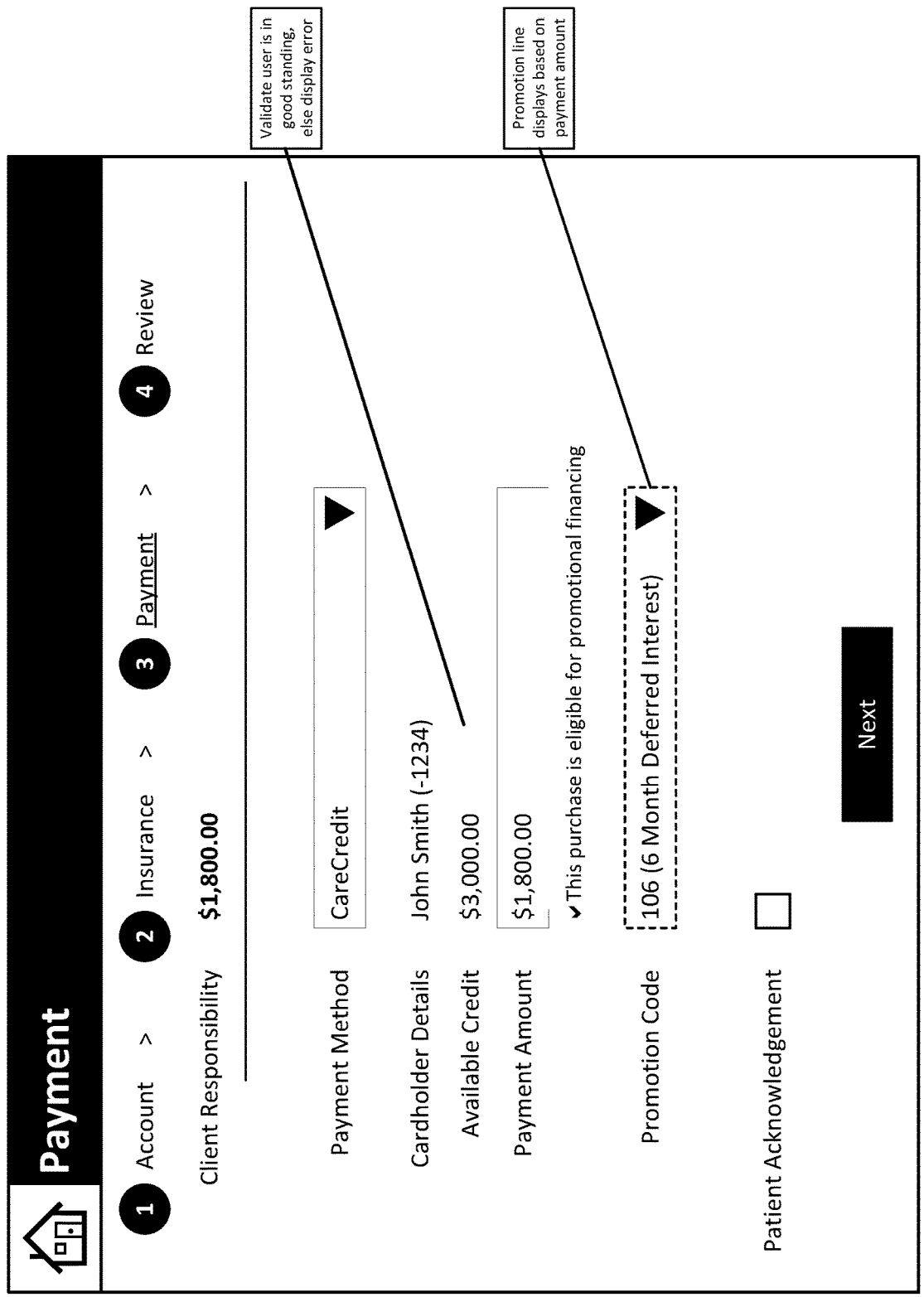

As illustrated in FIG. 7D, the interface may be used to provide a user with different payment options for payment of an outstanding balance. As noted above, the different payment options that may be presented to the user may be determined using data from the payment instrument presented by the user at the point-of-sale. The payment system may indicate, via the interface, the amount of available credit or balance within an account selected by the user. For instance, if the user selects a line of credit via the interface, the payment system may access the associated credit provider to validate that the user is in good standing with the credit provider and to obtain the available credit within this line of credit. The payment system may update the interface to display the amount of available credit or balance within the selected account. In an embodiment, via the interface, the user can select any combination of payment methods for the outstanding balance. These payment methods may include accounts associated with the presented payment instrument and/or accounts associated with alternative payment instruments (e.g., a credit card, debit card, etc.).

As noted above, the payment system may determine whether the user is eligible for one or more promotions. For instance, the payment system may determine whether the user is pre-qualified for a line of credit with a preferred credit provider. If the payment system determines that the user is pre-qualified for a line of credit with the preferred credit provider, the payment system may present, to the user, an offer to apply for a new line of credit with the preferred credit provider. Further, the payment system may access a promo management system to identify promotions that the user may be eligible for if the user applies for and uses a new line of credit from the preferred credit provider. These promotions may include service discounts, loyalty rewards points, coupons, and the like. The promotions may be presented to the user via the interface and, if the user wishes to take advantage of these promotions, the user may use the interface to apply for a line of credit with the preferred credit provider and, if approved, utilize the line of credit for the outstanding balance.

Figure 7E:
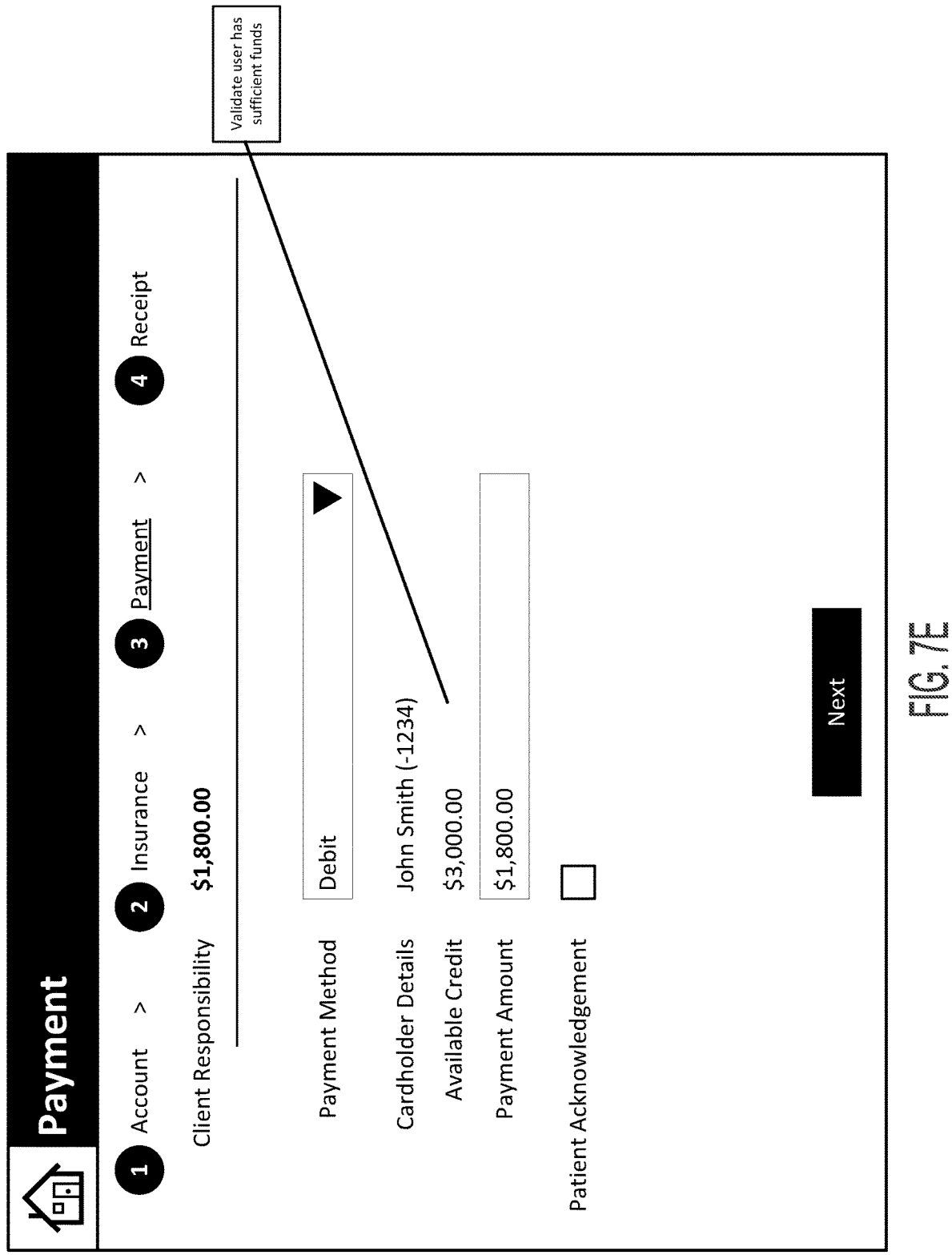

As illustrated in FIG. 7E, the payment system may provide the user with an interface through which the user may indicate an alternative payment method for the outstanding balance. For instance, if the user does not wish to utilize any of the payment methods associated with the presented payment instrument, the user may indicate that it wishes to utilize an alternative payment method (e.g., credit card, debit card, etc.). The payment system may attempt to determine the available resources associated with the alternative payment method in order to determine whether the alternative payment method may be used for the outstanding balance. If the payment system is able to determine the available resources for the selected alternative payment method, the payment system may present this to the user via the interface.

Figure 7F:
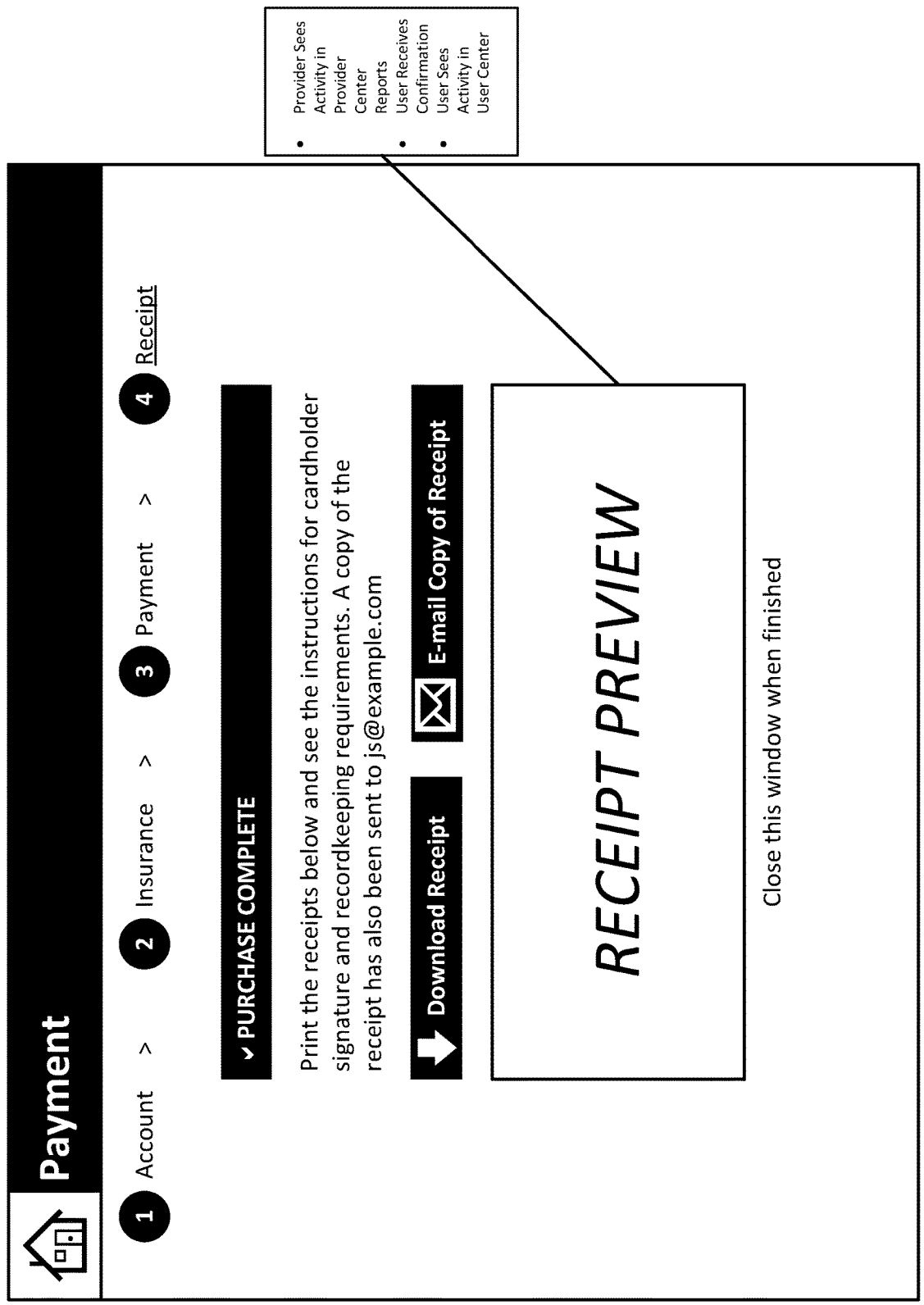

As illustrated in FIG. 7F is an exemplary interface for providing a receipt for the transaction. Through the interface, the user may receive confirmation of payment for the outstanding balance and select a communication method for receiving this confirmation (e.g., e-mail, physical copy, etc.). In an embodiment, if post-transaction adjudication is required, the payment system can transmit this confirmation, along with claim information, to the coverage provider for post-transaction adjudication. This action may be performed automatically such that the user is not required to initial post-transaction adjudication manually.

The disclosed single entry dual functionality system (e.g., payment system and enrollment system) can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

Figure 8:
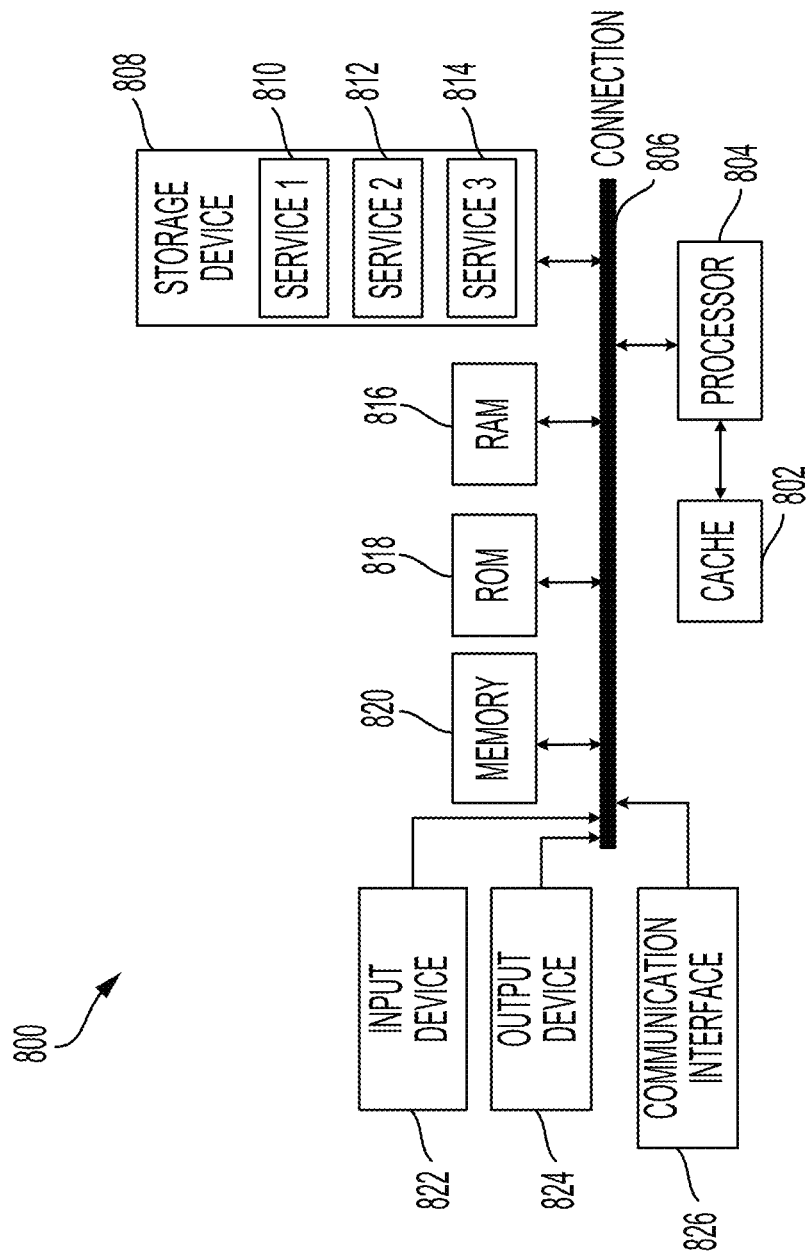
FIG. 8 shows an illustrative example of a computing system architecture including various components in electrical communication with each other using a connection in accordance with various embodiments.

FIG. 8 illustrates a computing system architecture 800 including various components in electrical communication with each other using a connection 806, such as a bus, in accordance with some implementations. Example system architecture 800 includes a processing unit (CPU or processor) 804 and a system connection 806 that couples various system components including the system memory 820, such as ROM 818 and RAM 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, RAMs 816, ROM 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD- ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
receiving information corresponding to a transaction, wherein the information corresponds to a coverage plan and a plurality of accounts, wherein the information is received via a single processing of a physical card that is swiped through a point-of-sale system, and wherein the single processing of the physical card causes a concurrent transmission of a first request and of a second request;

transmitting the first request to adjudicate a claim associated with the transaction, wherein the first request includes the claim and the coverage plan, wherein when the first request is received by a first system, the first system uses the claim and the coverage plan as input to a machine learning model, wherein an output of the machine learning model indicates an outstanding balance corresponding to the claim, and wherein the machine learning model is trained using post-transaction adjudication data corresponding to one or more previous transactions;

transmitting the second request to determine balances of the plurality of accounts, wherein when the second request is concurrently received in real-time by a second system that is separate and distinct from the first system, the second system determines the balances of the plurality of accounts;

receiving the outstanding balance corresponding to the claim;

concurrently receiving the balances of the plurality of accounts, wherein the balances of the plurality of accounts are determined in real-time as the first request is being processed;

presenting one or more accounts from the plurality of accounts, wherein the one or more accounts are identified based on the balances of the plurality of accounts and the post-transaction adjudication data;

completing the transaction by paying the outstanding balance using an account from the one or more accounts; and updating the machine learning model, wherein the machine learning model is updated using the completed transaction and the post-transaction adjudication data.

2. The computer-implemented method of claim 1, further comprising:

executing another machine learning model to determine one or more recommendations for modifications to the coverage plan, wherein the coverage plan and the claim are used as input to the other machine learning model, wherein an output of the other machine learning model indicates the one or more recommendations, and wherein the other machine learning model is trained using the post-transaction adjudication data.

3. The computer-implemented method of claim 1, further comprising:

transmitting the claim associated with the transaction;
receiving a reimbursement for the claim; and
automatically applying the reimbursement to the account.

4. The computer-implemented method of claim 1, wherein the coverage plan is associated with a coverage entity and the account is associated with a payment entity, and wherein the coverage entity and the payment entity are different entities.

5. The computer-implemented method of claim 1, further comprising:

executing another machine learning model to generate an offer for an increase to a credit limit associated with the account, wherein the claim is used as input to the other machine learning model, wherein an output of the other machine learning model indicates the offer, and wherein the other machine learning model is trained using the post-transaction adjudication data.

6. The computer-implemented method of claim 1, further comprising:

executing another machine learning model to generate a forecast of future medical expenditures, wherein the coverage plan, the plurality of accounts, the claim, and the outstanding balance are used as input to the other machine learning model, wherein an output of the other machine learning model indicates the forecast, and wherein the other machine learning model is trained using the post-transaction adjudication data.

7. The computer-implemented method of claim 1, further comprising:

determining an eligibility for one or more promotions applicable to the claim, wherein the eligibility is determined based on the one or more accounts and the claim.

8. A system, comprising:

one or more processors; and memory storing thereon instructions that, as a result of being executed by the one or more processors, cause the system to;

receive information corresponding to a transaction, wherein the information corresponds to a coverage plan and a plurality of accounts, wherein the information is received via a single processing of a physical card that is swiped through a point-of-sale system, and wherein the single processing of the physical card causes a concurrent transmission of a first request and of a second request;

transmit the first request to adjudicate a claim associated with the transaction, wherein the first request includes the claim and the coverage plan, wherein when the first request is received by a first system, the first system uses the claim and the coverage plan as input to a machine learning model, wherein an output of the machine learning model indicates an outstanding balance corresponding to the claim, and wherein the machine learning model is trained using post-transaction adjudication data corresponding to one or more previous transactions;

transmit the second request to determine balances of the plurality of accounts, wherein when the second request is concurrently received in real-time by a second system that is separate and distinct from the first system, the second system determines the balances of the plurality of accounts;

receive the outstanding balance corresponding to the claim;

concurrently receive the balances of the plurality of accounts, wherein the balances of the plurality of accounts are determined in real-time as the first request is being processed;

present one or more accounts from the plurality of accounts, wherein the one or more accounts are identified based on the balances of the plurality of accounts and the post-transaction adjudication data;

complete the transaction by paying the outstanding balance using an account from the one or more accounts; and update the machine learning model, wherein the machine learning model is updated using the completed transaction and the post-transaction adjudication data.

9. The system of claim 8, wherein the instructions further cause the system to execute another machine learning model to:

determine one or more recommendations for modifications to the coverage plan, wherein the coverage plan and the claim are used as input to the other machine learning model, wherein an output of the other machine learning model indicates the one or more recommendations, and wherein the other machine learning model is trained using the post-transaction adjudication data.

10. The system of claim 8, wherein the instructions further cause the system to:
transmit the claim associated with the transaction;
receive a reimbursement for the claim; and
automatically apply the reimbursement to the account.

11. The system of claim 8, wherein the coverage plan is associated with a coverage entity and the account is associated with a payment entity, and wherein the coverage entity and the payment entity are different entities.

12. The system of claim 8, wherein the instructions further cause the system to:
execute another machine learning model to generate an offer for an increase to a credit limit associated with the account, wherein the claim is used as input to the other machine learning model, wherein an output of the other machine learning model indicates the offer, and wherein the other machine learning model is trained using the post-transaction adjudication data.

13. The system of claim 8, wherein the instructions further cause the system to:
execute another machine learning model to generate a forecast of future medical expenditures, wherein the coverage plan, the plurality of accounts, the claim, and the outstanding balance are used as input to the other machine learning model, wherein an output of the other machine learning model indicates the forecast, and wherein the other machine learning model is trained using the post-transaction adjudication data.

14. The system of claim 8, wherein the instructions further cause the system to:
determine an eligibility for one or more promotions applicable to the claim, wherein the eligibility is determined based on the one or more accounts and the claim.

15. A non-transitory, computer-readable storage medium storing thereon executable instructions that, as a result of being executed by one or more processors of a computer system, cause the computer system to:
receive information corresponding to a transaction, wherein the information corresponds to a coverage plan and a plurality of accounts, wherein the information is received via a single processing of a physical card that is swiped through a point-of-sale system, and wherein the single processing of the physical card causes a concurrent transmission of a first request and of a second request;
transmit the first request to adjudicate a claim associated with the transaction, wherein the first request includes the claim and the coverage plan, wherein when the first request is received by a first system, the first system uses the claim and the coverage plan as input to a machine learning model, wherein an output of the machine learning model indicates an outstanding balance corresponding to the claim, and wherein the machine learning model is trained using post-transaction adjudication data corresponding to one or more previous transactions;
transmit the second request to determine balances of the plurality of accounts, wherein when the second request is concurrently received in real-time by a second system that is separate and distinct from the first system, the second system determines the balances of the plurality of accounts;
receive the outstanding balance corresponding to the claim;
concurrently receive the balances of the plurality of accounts, wherein the balances of the plurality of accounts are determined in real-time as the first request is being processed;
present one or more accounts from the plurality of accounts, wherein the one or more accounts are identified based on the balances of the plurality of accounts and the post-transaction adjudication data;
complete the transaction by paying the outstanding balance using an account from the one or more accounts; and
update the machine learning model, wherein the machine learning model is updated using the completed transaction and the post-transaction adjudication data.

16. The non-transitory, computer-readable storage medium of claim 15, wherein the executable instructions further cause the computer system to:
execute another machine learning model to determine one or more recommendations for modifications to the coverage plan, wherein the coverage plan and the claim are used as input to the other machine learning model, wherein an output of the other machine learning model indicates the one or more recommendations, and wherein the other machine learning model is trained using the post-transaction adjudication data.

17. The non-transitory, computer-readable storage medium of claim 15, wherein the executable instructions further cause the computer system to:
transmit the claim associated with the transaction;
receive a reimbursement for the claim; and
automatically apply the reimbursement to the account.

18. The non-transitory, computer-readable storage medium of claim 15, wherein the executable instructions further cause the computer system to:
execute another machine learning model to generate an offer for an increase to a credit limit associated with the account, wherein the claim is used as input to the other machine learning model, wherein an output of the other machine learning model indicates the offer, and wherein the other machine learning model is trained using the post-transaction adjudication data.

19. The non-transitory, computer-readable storage medium of claim 15, wherein the coverage plan is associated with a coverage entity and the account is associated with a payment entity, and wherein the coverage entity and the payment entity are different entities.

20. The non-transitory, computer-readable storage medium of claim 15, wherein the executable instructions further cause the computer system to:
execute another machine learning model to generate a forecast of future medical expenditures, wherein the coverage plan, the plurality of accounts, the claim, and the outstanding balance are used as input to the other machine learning model, wherein an output of the other machine learning model indicates the forecast, and wherein the other machine learning model is trained using the post-transaction adjudication data.

21. The non-transitory, computer-readable storage medium of claim 15, wherein the executable instructions further cause the computer system to:
determine an eligibility for one or more promotions applicable to the claim, wherein the eligibility is determined based on the one or more accounts and the claim.

* * * * *